US010480992B2

United States Patent
Sorimachi

(10) Patent No.: US 10,480,992 B2
(45) Date of Patent: Nov. 19, 2019

(54) VEHICLE PASSENGER DETECTION APPARATUS

(71) Applicant: Calsonic Kansei Corporation, Saitama-shi, Saitama (JP)

(72) Inventor: Mutsumi Sorimachi, Saitama (JP)

(73) Assignee: CALSONIC KANSEI CORPORATION, Saitama (JP)

(*) Notice: Subject to any disclaimer, the term of this patent is extended or adjusted under 35 U.S.C. 154(b) by 131 days.

(21) Appl. No.: 15/822,501

(22) Filed: Nov. 27, 2017

(65) Prior Publication Data

US 2018/0172501 A1    Jun. 21, 2018

(30) Foreign Application Priority Data

Dec. 16, 2016    (JP) .................. 2016-244663

(51) Int. Cl.
| | | |
|---|---|---|
| *B60R 21/015* | (2006.01) | |
| *G01G 23/01* | (2006.01) | |
| *G01G 19/414* | (2006.01) | |
| *B60N 2/00* | (2006.01) | |

(52) U.S. Cl.
CPC ............. *G01G 23/01* (2013.01); *B60N 2/002* (2013.01); *B60R 21/01516* (2014.10); *G01G 19/4142* (2013.01)

(58) Field of Classification Search
CPC ............ B60R 21/015; B60R 21/01512; B60R 21/01516; B60R 21/0152; B60R 21/01526; B60N 2/002; G01G 19/4142
See application file for complete search history.

(56) References Cited

U.S. PATENT DOCUMENTS

2012/0285752 A1* 11/2012 Sorimachi .............. B60N 2/002
                                                              177/136
2014/0277826 A1*  9/2014 Fujii ................. B60R 21/01516
                                                                701/1

FOREIGN PATENT DOCUMENTS

JP           2012-121378 A      6/2012

* cited by examiner

*Primary Examiner* — Herbert K Roberts

(57) ABSTRACT

A vehicle passenger detection apparatus is configured to monitor an occurrence of a passenger entering into a vehicle from a vacant seat state or an occurrence of the vacant seat state due to the passenger exiting from the vehicle, and to determine by calculations whether a detection value of a load sensor is stable before the passenger entered the vehicle or after the passenger exited the vehicle. Updating of a passenger determination result is executed even in a state in which a determination result from a vibration change amount judgment section indicates a disturbance has occurred, when the vehicle entry and exit determination section determines that the detection value of the load sensor is stable before the passenger entered the vehicle or after the passenger exited the vehicle.

4 Claims, 14 Drawing Sheets

VEHICLE PASSENGER DETECTION APPARATUS

CROSS-REFERENCE TO RELATED APPLICATIONS

This application claims priority to Japanese Patent Application No. 2016-244663, filed on Dec. 16, 2016. The entire disclosure of Japanese Patent Application No. 2016-244663 is hereby incorporated herein by reference.

BACKGROUND

Field of the Invention

The present invention relates to a vehicle passenger detection apparatus.

Background Information

Air bags devices that can protect a passenger sitting in a seat have been provided in vehicles such as automobiles, etc. This air bag device is provided with a vehicle passenger detection apparatus. This vehicle passenger detection apparatus is able to judge whether the air bag device provided in the vehicle is operative or inoperative, for example, by detecting whether or not a passenger is sitting in the seat, or if the sitting passenger is an adult or child, etc., (perform passenger determination or passenger detection). Such a vehicle passenger detection apparatus is provided with a load sensor attached to the seat, and a passenger detection means for detecting a passenger based on the detection value of this load sensor (see Japanese Laid-Open Patent Publication No. 2012-121378, for example).

SUMMARY

However, with the vehicle passenger detection apparatus described in Japanese Laid-Open Patent Publication No. 2012-121378, to make it possible to stably obtain accurate passenger determination results, when a vehicle vibration is large, the previous passenger determination results were held as is without updating the passenger determination results.

However, vibration also occurs when a passenger enters into a vehicle or a passenger exits the vehicle when the vehicle is stopped. It is therefore possible to cause a disturbance to the updating of the passenger determination result due to the vibration caused by the passenger's entering the vehicle or exiting the vehicle.

The purpose of the present invention is to make it possible to update passenger determination result early even in the aforementioned situation when a disturbance has occurred.

To achieve the purpose noted above, a vehicle passenger detection apparatus according to one embodiment includes a load sensor and a passenger detection unit. The load sensor is attached in the vicinity of a seat of a vehicle, and configured and arranged to detect a load acting on the seat. The passenger detection unit is configured and arranged to detect a passenger on the seat based on a detection value of the load sensor. The passenger detection unit includes a passenger determination section, a vibration change amount judgment section, a passenger judgment section, and a vehicle entry and exit determination section. The passenger determination section is configured to determine a sitting state of the passenger on the seat based on the detection value of the load sensor and a passenger judgment threshold value. The vibration change amount judgment section is configured to determine presence or absence of vehicle vibration based on the detection value of the load sensor and a vibration threshold value. The passenger judgment section is configured to judge whether to update a passenger determination result based on the sitting state from the passenger determination unit or to maintain a previous passenger determination result, based on a determination result from the vibration change amount judgment section. The vehicle entry and exit determination section is configured to monitor an occurrence of the passenger entering into the vehicle from a vacant seat state or an occurrence of the vacant seat state due to the passenger exiting from the vehicle, and to determine by calculations whether the detection value of the load sensor is stable before the passenger entered the vehicle or after the passenger exited the vehicle, when the occurrence of the passenger entering into the vehicle from the vacant seat state or the occurrence of the vacant seat state due to the passenger exiting from the vehicle is determined. The passenger judgment section is configured to execute updating of the passenger determination result even in a state in which the determination result from the vibration change amount judgment section indicates a disturbance has occurred, when the vehicle entry and exit determination section determines that the detection value of the load sensor is stable before the passenger entered the vehicle or after the passenger exited the vehicle.

With the vehicle passenger detection apparatus, it is possible to execute updating of a passenger determination result early even in a state when a disturbance has occurred due to the effect of vibration caused by the passenger's entering a vehicle or exiting a vehicle, for example.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Following, preferred modes for carrying out the vehicle passenger detection apparatus of the present invention are explained using the drawings.

First Embodiment

Configuration

First, the configuration of this embodiment is explained.

Figure 1:
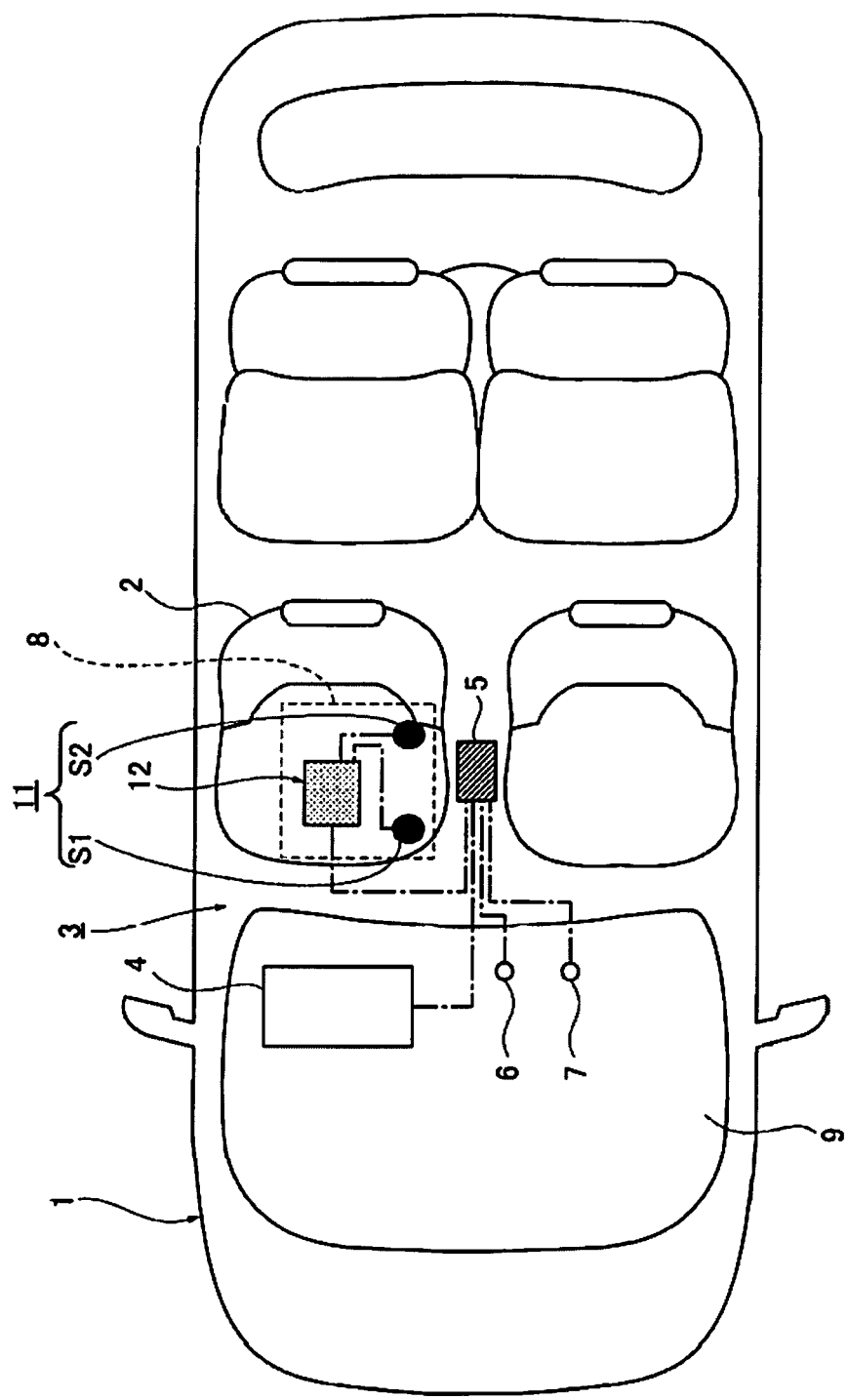
FIG. 1 is a schematic plan view showing a vehicle in which a vehicle passenger detection apparatus of one embodiment is mounted.
Figure 2:
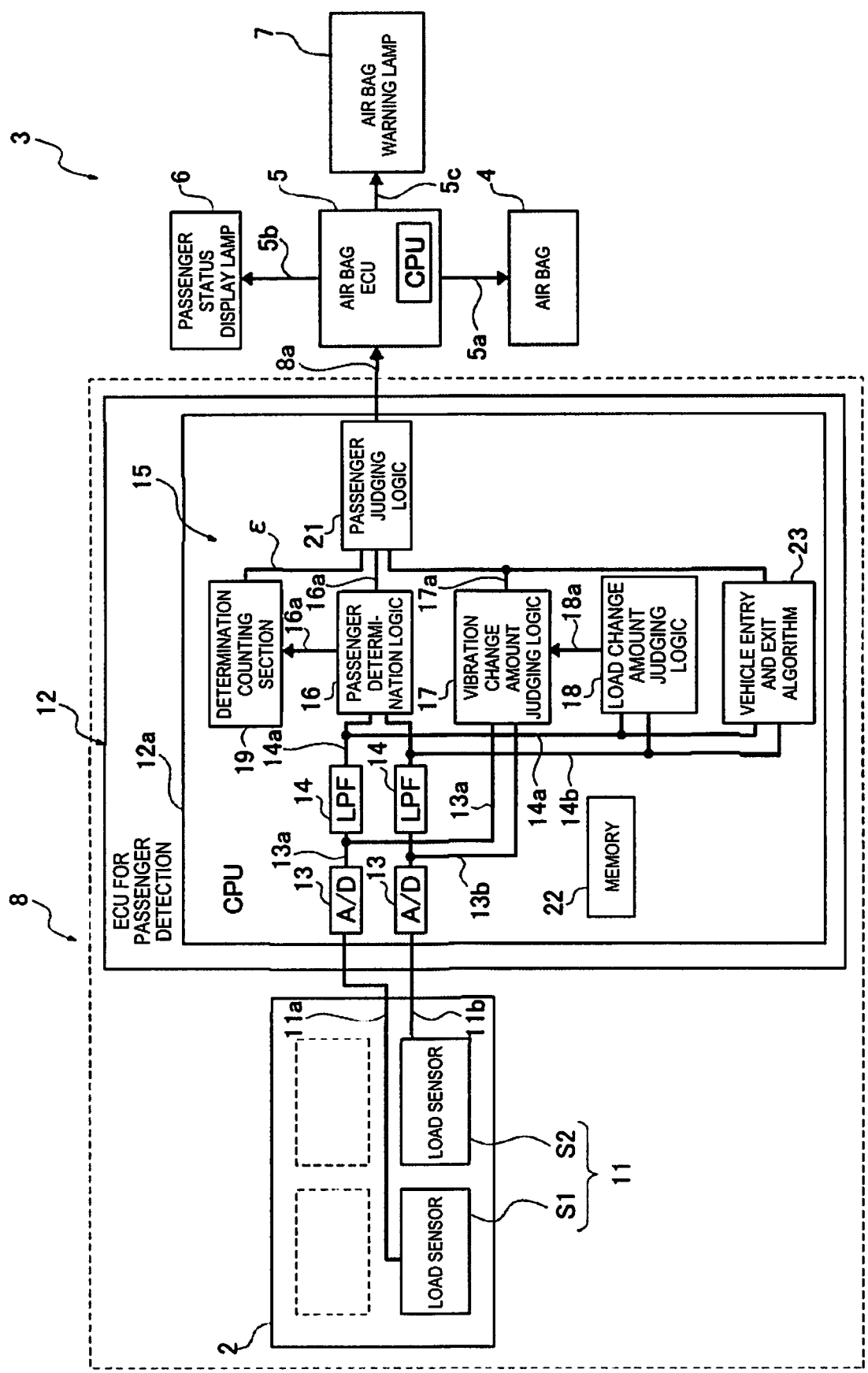
FIG. 2 is a block view showing the configuration of an air bag device having the vehicle passenger detection apparatus of the embodiment.

FIG. 1 is a schematic plan view showing a vehicle in which a vehicle passenger detection apparatus of this embodiment is mounted. FIG. 2 is a block diagram showing the configuration of an air bag device provided with the vehicle passenger detection apparatus of FIG. 1.

As shown in FIG. 1, provided in a vehicle 1 such as an automobile, etc., is a seat 2 for a passenger to sit on (a seat such as a passenger seat, etc., for example), and mounted in this seat 2 is an air bag device 3 that can protect a sitting passenger in case of emergencies. In the drawing, an example is shown of when the vehicle 1 is a left hand drive vehicle, but even if the vehicle 1 is a right hand drive vehicle, the air bag device 3 can be provided in the seat 2 such as a passenger seat, etc. in the same manner. It is also possible to use the same kind of air bag device 3 for the seat 2 other than a passenger seat (back seat, etc., for example).

Also, the air bag device 3 is mainly configured by an air bag module 4, and an air bag control device 5, and in addition to that, it also has a display device such as a passenger state indicator lamp 6, a warning lamp 7, etc. Furthermore, this air bag device 3 is provided with a vehicle passenger detection apparatus 8 (also see FIG. 2).

Here, the air bag module 4 is housed in a position in front of the seat 2, inside an instrument panel 9 placed at the front part of the vehicle cabin. Also, the air bag module 4 is housed in a state with the air bag body folded into a bag form, and exhibits a buffering function for the passenger by the air bag body deploying to protect the passenger during emergencies and expanding inside the vehicle cabin. As shown in FIG. 2, this air bag module 4 can be an item for which it is possible to change the size and the deployment force during deployment in at least two levels according to an air bag deployment signal 5a output from the air bag control device 5.

The air bag control device 5 has a CPU built in, and based on the passenger information 8a obtained using the vehicle passenger detection apparatus 8, it performs deployment judgment for the air bag module 4 such as not deploying when a passenger is not seated in the seat 2, deploying the air bag module 4 when an adult is seated in the seat 2, and not deploying the air bag module 4 (or deploying with weaker deployment force) when a child is seated in the seat 2, for example, and outputs the air bag deployment signal 5a to the air bag module 4.

Also, based on the passenger information 8a from the vehicle passenger detection apparatus 8, this air bag control device 5 outputs a display signal 5b to the passenger state indicator lamp 6, and outputs a failure signal 5c to the warning lamp 7 when a failure of the air bag device 3 is detected.

The passenger state indicator lamp 6 is installed in the instrument panel 8 that is placed at the front part of the vehicle cabin, and is a display lamp for displaying at least passenger information 8a such as, "Not sitting" (or "vacant seat"), "Adult sitting," or "Child sitting," etc., according to the display signal 5b output from the air bag control device 5.

The warning lamp 7 is installed in the instrument panel 9 that is placed at the front part of the vehicle cabin, and is a warning lamp for performing a warning display according to the failure signal 5c from the air bag control device 5 when failure of the air bag device 3 is detected.

The vehicle passenger detection apparatus 8 judges the sitting state of the passenger in the seat 2, and outputs the judged passenger information 8a to the air bag control device 5. The vehicle passenger detection apparatus 8 is provided with load sensors 11 as a load detection means, and a passenger detection unit 12 (control device for passenger detection). The vehicle passenger detection apparatus 8 is preferably configured so as to be able to perform a passenger determination alone by using as little information as possible from outside, and output the passenger information 8a.

There are two load sensors 11 (S1, S2) attached to the seat 2 or to its periphery, so as to be able to detect loads that act on the seat 2. For the load sensors 11, it is possible to use a piezoelectric film, etc. for outputting voltage signals according to applied pressure, for example.

Figure 3A:
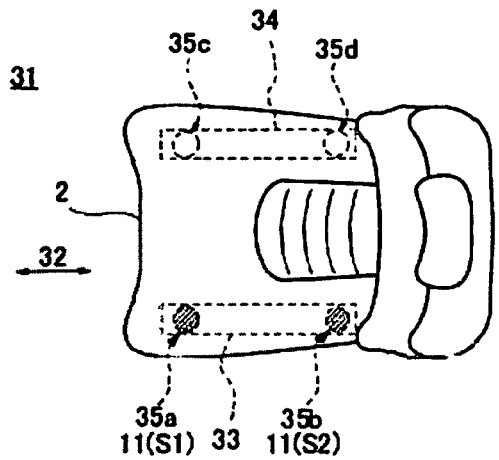
FIGS. 3A-3C show explanatory drawings of the attachment state of a load sensor of the vehicle passenger detection apparatus of the embodiment to a seat, with FIG. 3A being a plan view, FIG. 3B being a side view, and FIG. 3C being a front view.
Figure 3B:
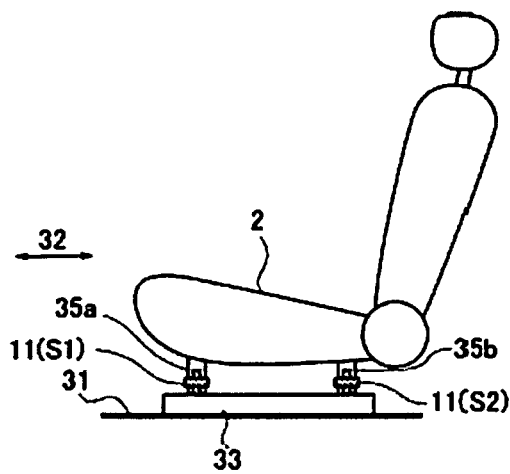
Figure 3C:
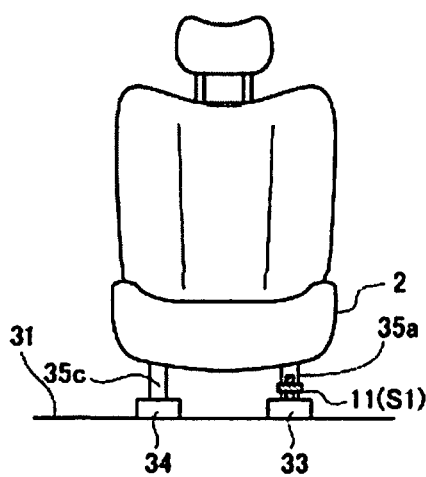

Also, as shown in FIG. 3, the seat 2 is attached to be able to slide (able to adjust position) in a front-back direction 32 via a left-right pair of parallel slide rails 33, 34 provided extending in the front-back direction 32 (vehicle front-back direction) on a vehicle body 31. At this time, the seat 2 is supported respectively at a total of four locations via front-back support points 35a, 35b and support points 35c, 35d on the left-right pair of slide rails 33, 34.

In this way, when the seat 2 is supported on the vehicle body 31 by the plurality of support points 35a to 35d, for example, it is possible to install (four) load sensors 11 at all the support points 35a to 35d, but in this case, the above-mentioned two load sensors 11 are installed at two of the positions among the plurality of support points 35a to 35d. In specific terms, one load sensor 11 (S1) is attached to a front side and inside support point 35a, and the other load sensor 11 (S2) is attached to a back side and inside support point 35b. Specifically, two load sensors 11 are provided in parallel in a state separated in the front-back direction 32 of the vehicle 1. In this way, by using two load sensors 11 (or reducing from four to two), it is possible to simplify the structure, and to speed up signal processing, etc.

In this way, by attaching two load sensors 11 aligned having a required gap in the front-back direction 32 of the vehicle 1, even when the vehicle 1 accelerates or decelerates, it is possible to perform passenger determination without being affected by that acceleration or deceleration.

This is because, for example, when the vehicle 1 has accelerated, the body of the passenger leans backward according to the acceleration speed of the vehicle 1, and the load applied to the front side load sensor 11 (S1) is smaller, and thereby the detection value 11*a* (see FIG. 2) output from the front side load sensor 11 (S1) becomes smaller, but conversely, the load applied to the back side load sensor 11 (S2) increases, so the detection value 11*b* (see FIG. 2) output from the back side load sensor 11 (S2) becomes larger, and the sum of the detection values 11*a*, 11*b* output from the two load sensors 11 (S1, S2) does not differ from when the vehicle 1 is traveling at a constant speed. This is also the same when the vehicle 1 decelerates.

Figure 4:
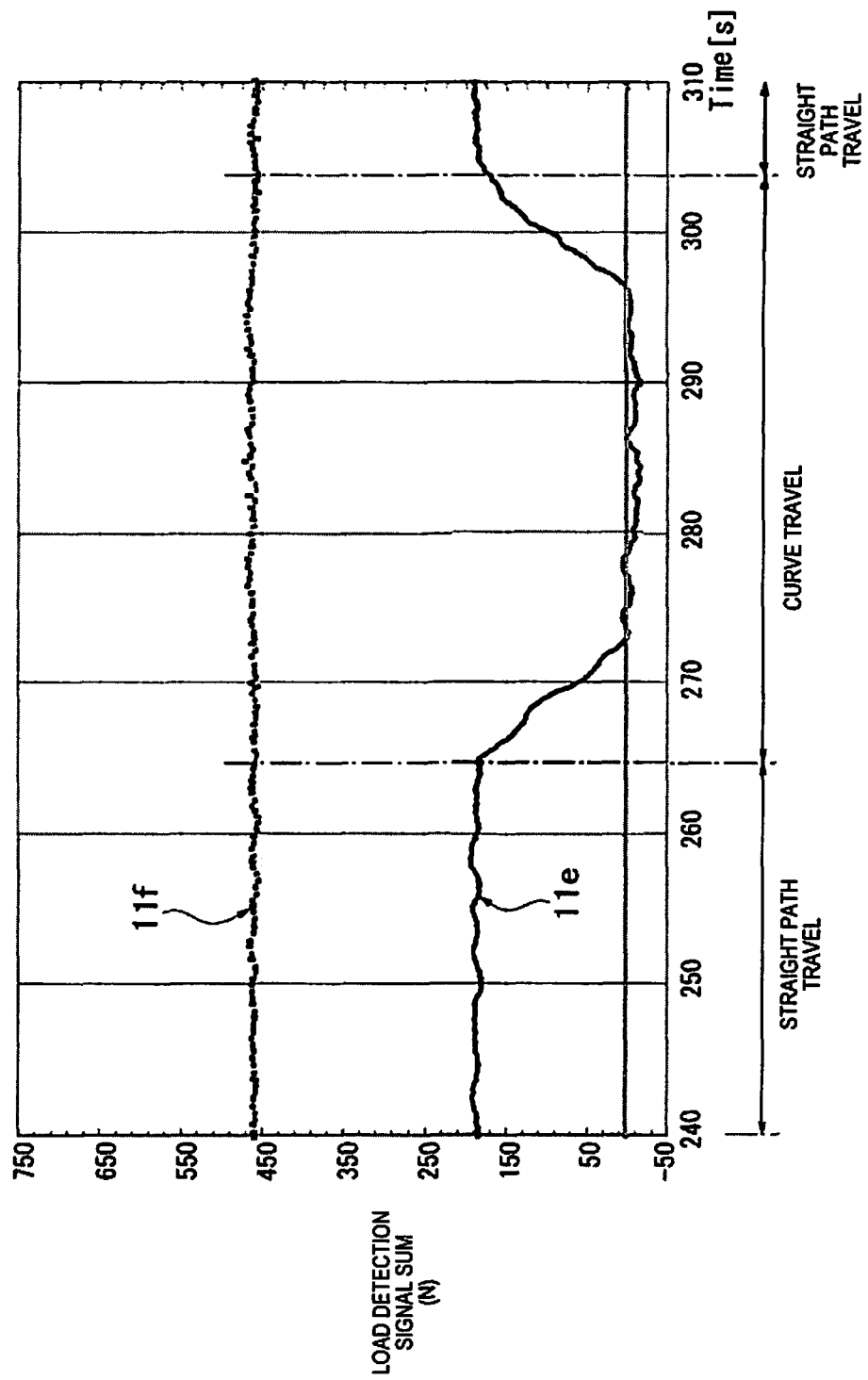
FIG. 4 is a graph showing the difference in detection values according to a difference in the number of installed load sensors.

Here, a specific example is explained of the detection values output from the load sensor 11. FIG. 4 is a graph showing the difference in characteristics of the detection values according to the difference in the number of installed load sensors 11.

The waveform of the characteristic 11*e* shown in FIG. 4 shows the sum of the detection values 11*a*, 11*b* output from the respective load sensors 11 (S1, S2) when the respective load sensors 11 (S1, S2) are installed on the support points 35*a*, 35*b* at two locations front and back, as in the case of this embodiment.

Also, the waveform of the characteristic 11*f* shown in FIG. 4 shows the sum of the detection values output from the four load sensors 11 in the case that four load sensors 11 are installed on all the support points 35*a* to 35*d*. The vehicle 1 is made to travel in the sequence of straight path, curve, and straight path.

Then, when the vehicle 1 is traveling on a straight path, the waveform of the characteristic 11*e* obtained with the load sensors 11 installed at two locations on one side (for example, inside support points 35*a*, 35*b*) is approximately half the size of the sum of the detection values shown by the characteristic 11*f* obtained when the load sensors 11 are installed at all the support points 35*a* to 35*d*.

Also, when the vehicle 1 is traveling on a curve, with the waveform of the characteristic 11*e*, compared to when traveling on a straight path, the sum of the detection values 11*a*, 11*b* is greatly reduced. This is because by centrifugal force acting on the reverse side (the outside of the vehicle body 31, for example) to the side on which the load sensors 11 (S1, S2) are installed, the body of the passenger leans to the outside of the vehicle body 31, and thereby, the load applied to the load sensors 11 (S1, S2) installed on the inside support points 35*a*, 35*b* is reduced.

To the contrary, though not illustrated, when traveling on a curve in the reverse direction to the abovementioned curve, the body of the passenger leans to the inside of the vehicle body 31, and almost the entire body weight of the passenger is thereby applied to the load sensors 11 (S1, S2) installed on the inside support points 35*a*, 35*b*, so the sum of the detection values 11*a*, 11*b* for the waveform of the characteristic 11*e* is a greater value than the sum of the detection values 11*a*, 11*b* when traveling on a straight path.

In contrast to this, in a case when the load sensors 11 are installed at all the support points 35*a* to 35*d* as the load detecting means, even when traveling on a curve, as shown by the waveform of the characteristic 11*f*, the same as when traveling on a straight path, the sum of the detection values is almost a stable value. This is because even when the body of the passenger leans due to the action of centrifugal force, when the output of all the load sensors 11 configuring the load detection means are added, the effect of the body weight movement of the passenger is offset, and the value is almost fixed.

Specifically, as the load detection means, by attaching the load sensors 11 (S1, S2) to only the two support points 35*a*, 35*b* at front and back on the inside slide rail 33, when traveling on a straight path, compared to when the load sensors 11 are attached to all the support points 35*a* to 35*d*, the sum of the detection values 11*a*, 11 *b* is different, but it is possible to obtain detection values 11*a*, 11 *b* with the same kind of characteristics.

Therefore, when traveling on a straight path, based on the sum of the detection values 11*a*, 11*b* output respectively from the load sensors 11 (S1, S2) attached to support points 35*a*, 35*b* at two locations front and back, it is possible to perform without hindrance the determination of the presence or absence of a passenger sitting in the seat 2, and whether an adult is sitting or a child is sitting (passenger determination).

On the other hand, when traveling on a curve, when the load sensors 11 (S1, S2) are attached only at the support points 35*a*, 35*b* at two locations front and back on the slide rail 33, a sum value is output that is different from the sum value of the detection values 11*a*, 11*b* obtained when traveling on a straight path, and furthermore, the characteristics of the detection values 11*a*, 11*b* differ according to whether on a right curve or a left curve, so it is difficult to accurately perform passenger determination using the detection values 11*a*, 11 *b* alone.

Therefore, by making it so that the passenger determination result obtained by performing a passenger determination is updated only when the vehicle 1 is traveling on a straight path, and making it so that when the vehicle 1 is traveling on a curve, even if the passenger determination is performed, the passenger determination result is not updated, it is possible to perform passenger detection without erroneous detection. Generally, compared to when traveling on a straight path, when traveling on a curve, the fluctuation in the detection values 11*a*, 11 *b* is greater, so if this fluctuation in the detection values 11*a*, 11*b* is detected, it is possible to identify when traveling on a straight path and when traveling on a curve. This is described in detail later.

The two load sensors 11, instead of being installed at the support points 35*a*, 35*b* at two locations front and back on the inside slide rail 33, it is also possible to install them at the support points 35*c*, 35*d* at two locations front and back on the outside slide rail 34, and aside from having left-right reverse centering even when set in this way, it is possible to obtain almost the same signals as noted above.

Returning to FIG. 2, the passenger detection unit 12 noted above has a CPU 12*a* (arithmetic processing unit) for performing passenger determination of the seat 2, and performs the necessary arithmetic processing based on the detection values 11*a*, 11*b* output from the two load sensors 11. Also, on the interior of this CPU 12*a*, provided are a signal converting unit 13, a vibration waveform removing unit 14, and a passenger determination unit 15.

The passenger determination unit 15 is provided at least with a passenger determination section 16 (or sitting determination section). The passenger determination section 16 is mainly for judging the seating status of a passenger in the seat 2, and finding the passenger determination result 16*a*.

The passenger determination unit 15 can also be provided with a vibration change amount judging section 17 (or vibration determination section), or a load change amount judging section 18 (or vibration threshold value setting section). The vibration change amount judging section 17 and the load change amount judging section 18 are mainly for judging the status of the vehicle 1.

Furthermore, it is also possible to provide the passenger determination unit 15 with a determination counting section 19 (a section for counting the number of passenger determinations). This determination counting section 19 is mainly for forcibly executing updating of the passenger determination result 16a when the same passenger determination result 16a continues for a fixed time.

Furthermore, the passenger determination unit 15 is provided with a passenger judgement section 21 (update judging section or passenger determination result update advisability judging section). This passenger judgement section 21 is for judging whether to update the passenger determination result 16a in regards to the sitting state from the passenger determination section 16 or to maintain the previous passenger determination result 16a based on the presence or absence of vehicle vibration 17a from the vibration change amount judging section 17 or the count ε by the determination counting section 19. The passenger determination section 16 operates so as to always continue sending the passenger determination result 16a to the passenger judgement section 21. Also, the vibration change amount judging section 17 operates so as to always continue sending the presence or absence of the vehicle vibration 17a to the passenger judgement section 21. The determination counting section 19 operates so as to always continue sending the count ε to the passenger judgement section 21.

Each part of the passenger determination unit 15 can be configured as a function block using software. The software is stored in a memory 22 (internal memory or external memory) provided inside or outside the CPU 12a, and is executed by the CPU 12a. Also, for example, the passenger determination section 16 is configured as passenger determination logic, the vibration change amount judging section 17 is configured as vibration change amount judging logic, the load change amount judging section 18 is configured as load change amount judging logic, the determination counting section 19 is configured as determination counting logic, and the passenger judgement section 21 is configured as passenger judging logic.

Also, during the time from when the vehicle 1 power turns on until it turns off, each part of the vehicle passenger detection apparatus 8 always continues operating. Also, the memory 22 is made to be able to suitably record input and output to each part of the passenger detection unit 12. Thus, each part of the passenger detection unit 12 is made to be able to mutually reference and use input/output.

In more detail, the signal converting unit 13 reads the detection values 11a, 11b output respectively from the two load sensors 11, and converts them from analog signals to digital signals (detection values 13a, 13b). This signal converting unit 13 is provided respectively in each load sensor 11 attached to the seat 2.

The vibration waveform removing unit 14 removes vibration waveforms indicating that the vehicle 1 is vibrating from within the detection values 13a, 13b digitized by the signal converting unit 13, and generates vibration waveform removed signals 14a, 14b. Here, "vibration waveform" means, for example, the vertical direction high frequency vibration component (vehicle vibration such as travelling vibration, etc.). As this vibration waveform removing unit 14, it is possible to use a low pass filter (LP or LPF) capable of removing vibration waveforms such as high frequency vibration components, etc. The low pass filter can divide use of a plurality of items of different frequencies that can be removed according to purpose or status. This vibration waveform removing unit 14 is provided corresponding to the respective signal converting unit 13.

When just saying the detection value (or load detection signal), in some cases this indicates load detection signals from the load sensors 11 (detection values 11a, 11b, or the sum of these), detection values 13a, 13b (or the sum of these) digitized by the signal converting unit 13, and vibration waveform removed signals 14a, 14b (or the sum of these) which are the detection values for which the vibration waveform is removed by the vibration waveform removing unit 14. There are also cases of when this means detected load or weight information, etc. depending on the status.

Also, the load change amount judging section 18 sets a vibration threshold value 18a used with the vibration change amount judging section 17, based on the detection values after the vibration waveform is removed by the vibration waveform removing unit 14 from the digitized detection values 13a, 13b, in other words, the waveform removed signals 14a, 14b. Here, "vibration threshold value 18a" is a reference value used when determining the presence or absence of the occurrence of vehicle vibration 17a. In this case, the load change amount judging section 18 is made to be able to differentiate the vibration threshold value 18a by when the fluctuation amount of the vibration waveform removed signals 14a, 14b is small, and when the fluctuation amount of the vibration waveform removed signals 14a, 14b is large. For example, when the state of the fluctuation amount of the vibration waveform removed signals 14a, 14b being small continues for a prescribed time, the load change amount judging section 18 is able to change the vibration threshold value 18a to be a higher value than when the fluctuation amount of the vibration waveform removed signals 14a, 14b is large.

Figure 5:
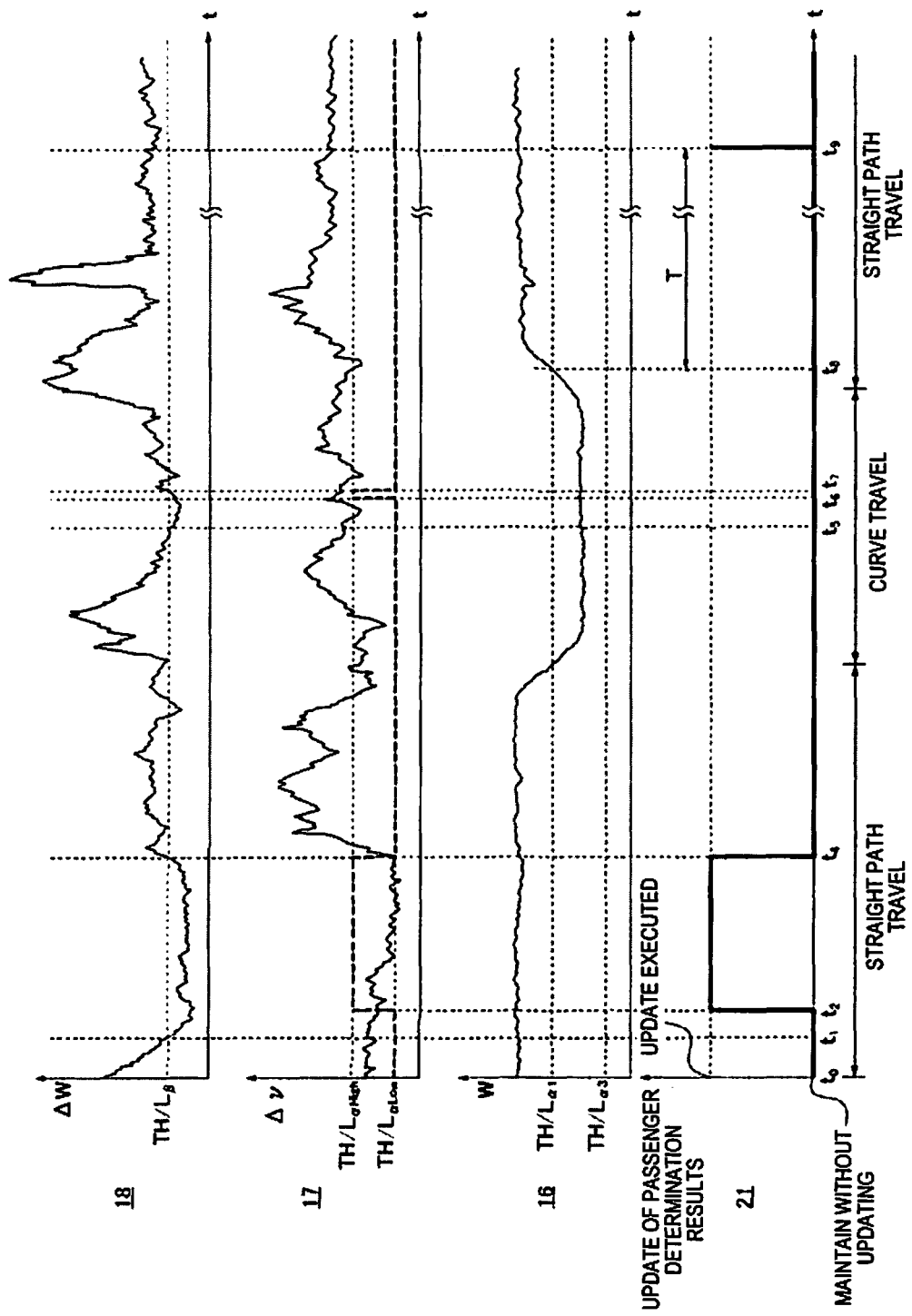
FIG. 5 is a time chart showing, when an adult is on the sea during vehicle traveling, a load change amount, a vibration change amount, a detected load, and a passenger determination result update timing.

In specific terms, this setting of the vibration threshold value 18a is as shown in FIG. 5. Specifically, the load change amount judging section 18 finds the sum of the vibration waveform removed signals 14a, 14b, and finds the load change amount $\Delta W$ which is the absolute value of the fluctuation amount of this sum. Then, this load change amount $\Delta W$ is compared with a weight threshold value (TH/L$\beta$) that is set in advance in the load change amount judging section 18. Then, when a state for which the load change amount $\Delta W$ is lower than the weight threshold value (TH/L$\beta$) continues for a prescribed time, this is regarded as output that the load that acts on the seat 2 is stable, in other words, the weight information is stable, and a preset vibration threshold value 18a of a high value (TH/L$\alpha$High) is selected. On the other hand, when the load change amount $\Delta W$ exceeds the aforementioned weight threshold value (TH/L$\beta$), this is regarded as output that the load that acts on the seat 2 is unstable, in other words, the output weight information is unstable, and a preset vibration threshold value 18a of a low value (TH/L$\alpha$Low) is selected.

Then, the vibration change amount judging section 17 determines the presence or absence of the occurrence of the vehicle vibration 17a based on the detection values 13a, 13b digitized by the signal converting unit 13, and the vibration threshold value 18a (TH/L$\alpha$High or TH/L$\alpha$Low) set by the load change amount judging section 18. Here, the detection values 13a, 13b digitized by the signal converting unit 13 means the detection values 13a, 13b including many vibration waveforms before removal of the vibration waveforms from the detection values 11a, 11b by the vibration waveform removing unit 14.

Then, with the determination of the presence or absence of the occurrence of the vehicle vibration 17a by the vibration change amount judging section 17, in specific terms, found is the absolute value of the fluctuation amount of the detection value 11a (detection value 13a for which this is digitized) output from the load sensor 11 (S1) on the front side of the inside of the seat 2, and the detection value 11$b$ (detection value 13$b$ for which this is digitized) output from the load sensor 11 (S2) on the rear side of the inside of the seat 2. Then, the vibration change amount $\Delta v$ which is the sum of the absolute values of these fluctuation amounts is found, and this vibration change amount $\Delta v$ is compared with the vibration threshold value 18$a$ (TH/L$\alpha$High or TH/L$\alpha$Low) selected by the load change amount judging section 18. Then, if the vibration change amount $\Delta v$ is the vibration threshold value 18$a$ selected at that time or greater, it is determined that the vehicle vibration 17$a$ has occurred. On the other hand, if the vibration change amount $\Delta v$ is less than the vibration threshold value 18$a$, it is determined that the vehicle vibration 17$a$ has not occurred.

Then, the passenger determination section 16 executes passenger determination using the detection values after removal of the vibration waveform from the digitized detection values 13$a$, 13$b$ by the vibration waveform removing unit 14, in other words, the vibration waveform removed signals 14$a$, 14$b$. Here, "passenger determination" means performing seating determination that determines whether or not a passenger is seated in the seat 2, and body type determination that determines if the body type of the passenger seated in the seat 2 is large or not (whether an adult or child, etc.). It is sufficient to execute one or the other of these.

In specific terms, this passenger determination finds the detected load W as the sum of the vibration waveform removed signals 14$a$, 14$b$, and is performed by comparing this detected load W with a "passenger judgment threshold value" which is a weight threshold value set in advance in the passenger determination section 16. Examples of the passenger judgment threshold value set in advance in the passenger determination section 16 include a first threshold value TH/L$\alpha$1, a second threshold value TH/L$\alpha$2 (not illustrated), a third threshold value TH/L$\alpha$3 (not illustrated), etc. Of these, for example, the first threshold value TH/L$\alpha$1 determines that an adult is sitting (=AdultTH/L), the second threshold value TH/L$\alpha$2 determines that a child is sitting (=ChildTH/L), and the third threshold value TH/L$\alpha$3 determines that the seat is vacant (=EmptyTH/L). The size of the passenger judgment threshold value is first threshold value>second threshold value>third threshold value.

Then, for example, if the detected load is the first threshold value TH/L$\alpha$1 or greater, it is determined that an adult is sitting, if the detected load is the second threshold value TH/L$\alpha$2 or greater and less than the first threshold value TH/L$\alpha$1, it is determined that a child is sitting, and if the detected load is the third threshold value TH/L$\alpha$3 or greater and less than the second threshold value TH/L$\alpha$2, it is determined that the seat is vacant. However, the passenger judgment threshold values are not limited to the items noted above. For example, it is possible to set a threshold value between the second threshold value and the third threshold value that determines the presence or absence of luggage on the seat 2 (=NobodyTH/L), etc.

The passenger judgement section 21 judges whether to update the passenger determination result 16$a$, or to hold the passenger determination result 16$a$ based on the judging results of the vibration change amount judging section 17 (presence or absence of the vehicle vibration 17$a$), and the passenger determination result 16$a$ (or seating determination) of the passenger determination section 16, and also outputs to the air bag control device 5 as the passenger information 8$a$ the updated passenger determination result 16$a$ or the held (previous) passenger determination result 16$a$.

Specifically, when the vibration change amount judging section 17 (based on the aforementioned detection values 13$a$, 13$b$) determines that the vehicle vibration 17$a$ has not occurred, this passenger judgement section 21 updates the passenger determination result 16$a$ with the passenger determination result output from the passenger determination section 16 as the new passenger determination result 16$a$. On the other hand, when the vibration change amount judging section 17 determines (based on the aforementioned detection values 13$a$, 13$b$) that the vehicle vibration 17$a$ has occurred, the passenger determination result 16$a$ output from the passenger determination section 16 is not used as the new passenger determination result 16$a$, but rather the previous passenger determination result 16$a$ are held.

As a result, with the passenger determination unit 15, when it is determined that the vehicle vibration 17$a$ has not occurred, the status of the vehicle 1 is regarded as being stable, and the passenger determination execution results are updated, and when it is determined that the vehicle vibration 17$a$ has occurred, the status of the vehicle 1 is regarded as unstable, and even if the passenger determination is executed, those results are not updated, and the previous passenger determination result 16$a$ is held.

Determination Counting Section 19

Furthermore, the determination counting section 19 is for forcibly updating the passenger determination result 16$a$ in cases when the same passenger determination result 16$a$ continues for a fixed period. To do that, the determination counting section 19 counts the number of times the same passenger determination result 16$a$ was obtained successively, and outputs the counted value (count $\varepsilon$) to the passenger judgement section 21. In response to this, in regards to the output results of the determination counting section 19 as well, the passenger judgement section 21 performs judging of whether to execute updating of the aforementioned passenger determination result 16$a$, or to hold the previous passenger determination result 16$a$.

Specific Operation of Each Part

Following is explained an example of the basic operation of the passenger determination unit 15 during traveling of the vehicle 1 based on the waveforms actually acquired by the load sensors 11.

FIG. 5 is a time chart respectively showing the update timing of the load change amount $\Delta W$ according to the load change amount judging section 18, the vibration change amount $\Delta v$ according to the vibration change amount judging section 17, the detected load W according to the passenger determination section 16, and the passenger determination result 16$a$ according to the passenger judgement section 21, when the vehicle 1 travels in the sequence of a straight path, a curve, and a straight path, in a state when an adult (a female of body weight 49 kg, for example) has entered the vehicle on the seat 2 (passenger seat).

With this vehicle passenger detection apparatus 8, when the load change amount $\Delta W$ is small, the load change amount judging section 18 is made to set the vibration threshold value 18$a$ (TH/L$\alpha$High or TH/L$\alpha$Low) of the vibration change amount judging section 17 to a higher value (TH/L$\alpha$High) than when the load change amount $\Delta W$ is large. Because of that, when the vehicle 1 has traveled the initial straight path and the stabilized detected load W is output, the load change amount ΔW of the load change amount judging section 18 at the point of time t1 is below the weight threshold value TH/Lβ.

Then, at the point of time t2, the state of the load change amount ΔW with the load change amount judging section 18 being below the weight threshold value TH/Lβ elapses for a prescribed time (3 seconds, for example). As a result, the vibration threshold value 18*a* (TH/LαLow) of the vibration change amount judging section 17 is changed to the vibration threshold value 18*a* (TH/LαHigh) that is a higher value than that. As a result, at times t2 to t4, the vibration change amount Δv goes below the vibration threshold value 18*a* (TH/LαHigh), so the passenger determination by the passenger determination section 16 is executed, and the passenger determination result 16*a* is updated by the passenger judgement section 21.

Then, at the point of time t4, when the load change amount ΔW with the load change amount judging section 18 goes above the weight threshold value TH/Lβ, the vibration threshold value 18*a* (TH/LaαHigh) of the vibration change amount judging section 17 changes to the vibration threshold value 18*a* (TH/LαLow) that is a lower value than that. Then, from time t4 and thereafter, the vibration change amount Δv goes above the vibration threshold value 18*a* (TH/LαLow), so the passenger determination by the passenger determination section 16 is executed, but with the passenger judgement section 21, the previous passenger determination result 16*a* is maintained or held, without updating the passenger determination result 16*a*.

After that, when the vehicle 1 travels on a curve of a round path, with the status of the detection values 11*a*, 11 *b* being detected by the two load sensors 11 (S1, S2) as noted above, the detected load W which is the sum of the vibration waveform removed signals 14*a*, 14*b* is greatly reduced by the effect of centrifugal force acting on the seat 2. In accordance with this, the load change amount ΔW according to the load change amount judging section 18 gradually decreases after rising once, so at the point of time t5, it goes below the weight threshold value TH/Lβ, and at the point of time t6, a prescribed time (3 seconds, for example) elapses with that status continuing.

Because of this, at the point of time t6, the low vibration threshold value 18*a* (TH/LαLow) of the vibration change amount judging section 17 changes to the high vibration threshold value 18*a* (TH/LαHigh). However, in the case of FIG. 5, at the point of time t7, the load change amount ΔW according to the load change amount judging section 18 again goes above the weight threshold value TH/Lβ, so with the vibration change amount judging section 17, the vibration threshold value 18*a* (TH/LαHigh) status does not continue, and the vibration threshold value 18*a* changes to TH/LαLow, and with the passenger determination section 16, passenger determination is executed, but with the passenger judgement section 21, the previous passenger determination result 16*a* is maintained without updating the passenger determination result 16*a*.

After that, when the vehicle 1 is again traveling on a straight path, at time t8, with the passenger determination section 16, the detected load W goes above a first threshold value TH/Lα1, so the passenger determination result 16*a* determined to be a child sitting or a vacant seat while traveling on a curve become passenger determination result 16*a* of an adult sitting, and are output. At this time, with the determination counting section 19, the passenger determination result 16*a* is the same as the previous time (one time prior), and the count ε indicating the number of times is cleared.

Then, when traveling on the straight path further continues, during the time until a specified period T set for forcibly updating from time t8 up to time t9 has elapsed, the count ε of the determination counting section 19 does not reach the count value N indicating the period T, so the vibration change amount Δv with the vibration change amount judging section 17 goes above the vibration threshold value 18*a* (TH/LαLow), so the passenger determination by the passenger determination section 16 is executed, but at the passenger judgement section 21, the passenger determination result 16*a* of the previous time is maintained, without updating the passenger determination result 16*a*. The period T is set to be a sufficiently long time (such as 3 minutes, for example) in relation to the maximum time (one minute, for example) required to travel on a gentle curve with a long radius of curvature on a typical road, for example.

After that, when time t9 is reached, the count ε of the determination counting section 19 reaches a prescribed count value N, so though the vibration change amount Δv with the vibration change amount judging section 17 remains above the vibration threshold value 18*a* (TH/LαLow), the passenger determination by the passenger determination section 16 is executed, and also the updating of the passenger determination result 16*a* by the passenger judgement section 21 is executed.

Then, because the count ε of the determination counting section 19 is cleared, thereafter, if the vibration change amount Δv with the vibration change amount judging section 17 is in a state remaining above the vibration threshold value 18*a* (TH/LαLow), during the time until the prescribed period T elapses again, even if the passenger determination by the passenger determination section 16 is executed, the previous passenger determination result 16*a* is maintained without updating of the passenger determination result 16*a* being executed by the passenger judgement section 21.

From the above, the passenger determination result 16*a* is updated at times t2 to t4 and time t9, so the correct determination result 16*a* of "adult" is respectively output.

Then, when the passenger determination result 16*a* according to the passenger detection unit 12 over a prescribed period T do not change even when the vibration change amount Δv with the vibration change amount judging section 17 goes above the vibration threshold value 18*a* (TH/LαHigh or TH/LαLow), specifically, when it is determined that vehicle vibration 17*a* has occurred, the passenger determination result 16*a* is updated each time the prescribed period T has elapsed, so when traveling on a gentle curve with a large radius of curvature for which there is a possibility of error for the passenger determination according to the load change, it is possible to update the passenger determination result 16*a* after passing that curve. It is also possible to update the passenger determination result 16*a* reliably for each prescribed period T without being affected by the occurrence of the vehicle vibration 17*a*.

Furthermore, when the vehicle 1 is stopped, for example, even when it is determined that there is no one sitting due to the passenger rising from the seat, etc., it is possible to reliably update the passenger determination result 16*a* for each prescribed period T, so after that, when the passenger is in a sitting state, sitting can be determined early.

Also, when the vehicle 1 is stopped, even when the passenger rocks his body forward and backward, or continues to fidget, etc., it is possible to reliably update the passenger determination result 16*a* for each prescribed period T. t, T, and N are local variables used only for this location, and when used in a different location, have a different meaning (same hereafter).

(1) Furthermore, with this embodiment, in addition to what is noted above, as shown in FIG. 2, the passenger determination unit 15 is also provided with a vehicle entry and exit determination section 23 (or stability judgment section).

Figure 6:
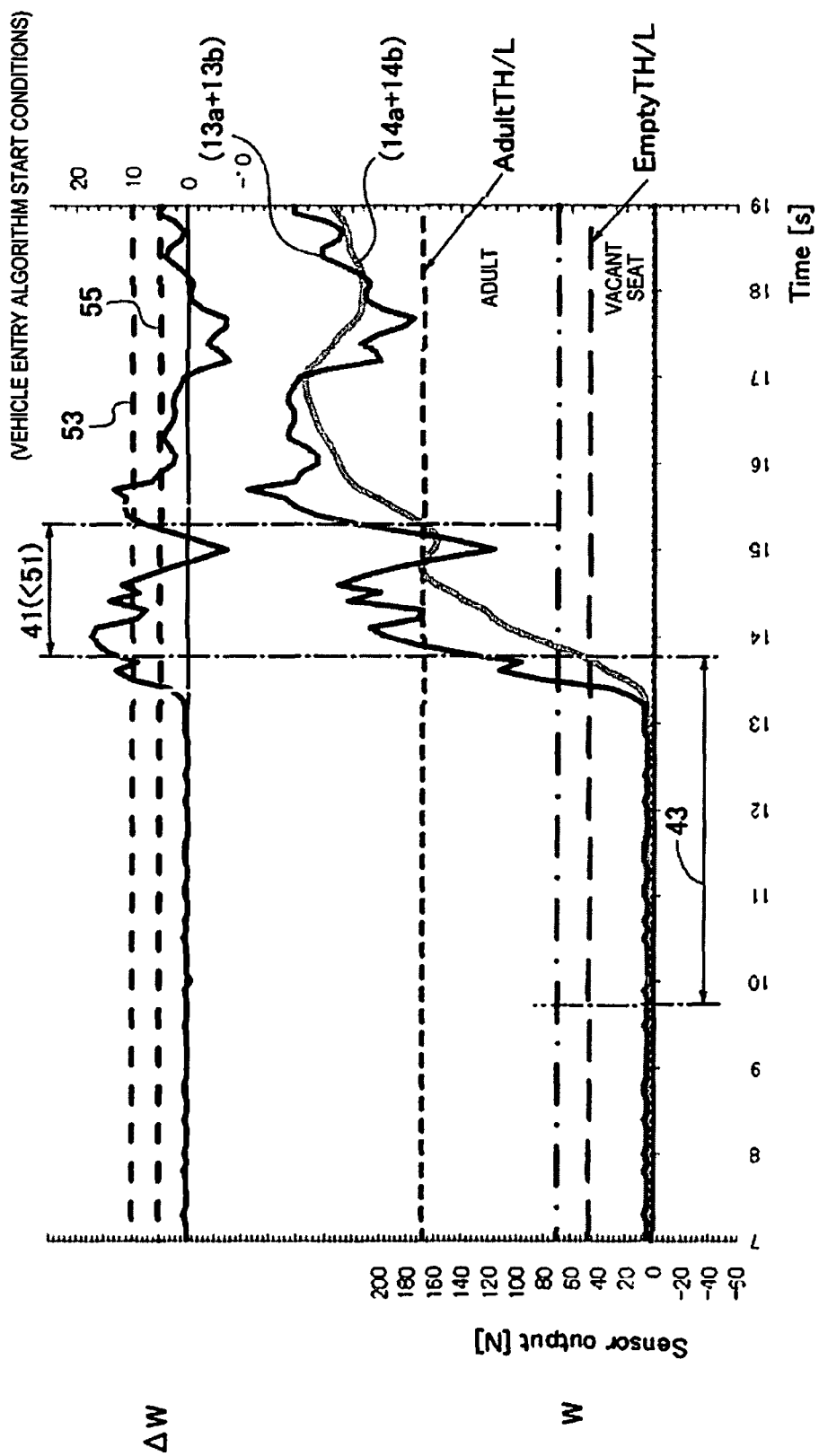
FIG. 6 is a graph showing a detected load and a load change amount for explaining a vehicle entry algorithm.

This vehicle entry and exit determination section 23 monitors the occurrence of vehicle entry from the vacant seat state (segment 41) as shown in FIG. 6, or the occurrence of a vacant seat state due to exiting of the vehicle (segment 42) (performs monitoring of vehicle entry and exit). Then, when vehicle entry from the vacant seat state or the vacant seat state due to vehicle exit is applicable, this unit finds this by respectively calculating whether before vehicle entry (segment 43 in FIG. 6) is stable, or whether after vehicle exit (segment 44 in FIG. 7) is stable (performs stability judgment).

Then, when "stable" is output for the calculation results with the vehicle entry and exit determination section 23, even in a state when updating of the passenger determination result 16a is not performed even in a state when a disturbance has occurred, the passenger determination unit 15 (the passenger judgement section 21 thereof) is made to execute (temporary and forcible) updating of the passenger determination result 16a.

Here, when a disturbance has occurred, there is a possibility of going to a state in which updating of the passenger determination result is not performed. The state of updating of the passenger determination result 16a not being performed (hold state) includes a state when the previous passenger determination result 16a is supposed to be held, or midway in execution of the passenger determination result 16a (before the passenger determination result 16a is output) or directly after execution (after the passenger determination result 16a is output). During execution or directly after execution of the passenger determination result 16a, this goes to a state for which updating of the passenger determination result 16a is not performed (hold state) by performing a required standby process, etc., to increase the determination precision, etc., with each part of the passenger determination unit 15 (at least one item among the passenger determination section 16, the vibration change amount judging section 17, the load change amount judging section 18, the determination counting section 19, and the passenger judgement section 21).

The vehicle entry and exit determination section 23 can be thought of as an item that performs exception processing on the vibration change amount judging section 17 which is made to eliminate all of the effects of vibration.

The vehicle entry and exit determination section 23 inputs vibration waveform removed signals 14a, 14b which are detection values with vibration waveforms removed by the vibration waveform removing unit 14 (or it is also possible to use detection values 13a, 13b digitized by the signal converting unit 13), finds the detected load W or the load change amount ΔW (or these are obtained from the memory 22 or another part (the passenger determination section 16 or the load change amount judging section 18)), and furthermore, performs monitoring of the aforementioned vehicle entry and exit or stability calculation (stability judgment process), etc., noted above using these, and outputs the presence or absence of vehicle entry and vehicle exit to the passenger judgement section 21.

The vehicle entry and exit determination section 23 can use either of the detection values of the vibration waveform removed signals 14a, 14b, etc., and the detection values 13a, 13b, but with this embodiment, the vibration waveform removed signals 14a, 14b are used with a filter applied with the vibration waveform removing unit 14. The used filter is able to make an optimal value for the vehicle entry and exit determination section 23. Hereafter, when "detection value" is mentioned, this indicates one of the vibration waveform removed signals 14a, 14b and the detection values 13a, 13b.

The vehicle entry and exit determination section 23 can be configured as a function block using the aforementioned software. The vehicle entry and exit determination section 23 can be configured as a vehicle entry and exit algorithm, etc. provided with a vehicle entry algorithm and a vehicle exit algorithm, for example. Forced execution of updating of the passenger determination result 16a is enabled only for a very short time, approximately 1 second, for example.

The vehicle entry and exit determination section 23 first uses the detected load W and two passenger judgment threshold values (AdultTH/L, EmptyTH/L) to perform monitoring of vehicle entry or vehicle exit (vehicle entry monitoring or vehicle exit monitoring).

In the case of vehicle exit, the detected load W decreases to become 0 [N], but in the case of a curve, the detected load W does not necessarily become 0 [N], and may swing greatly to one side in the extreme beyond 0 [N] (−45 [N] or less, for example), and when the detected load W swings greatly to one side, it is clearly not exiting from the vehicle, so it is possible to judge this as traveling on a curve, and immediately stop monitoring of vehicle exiting.

Figure 7:
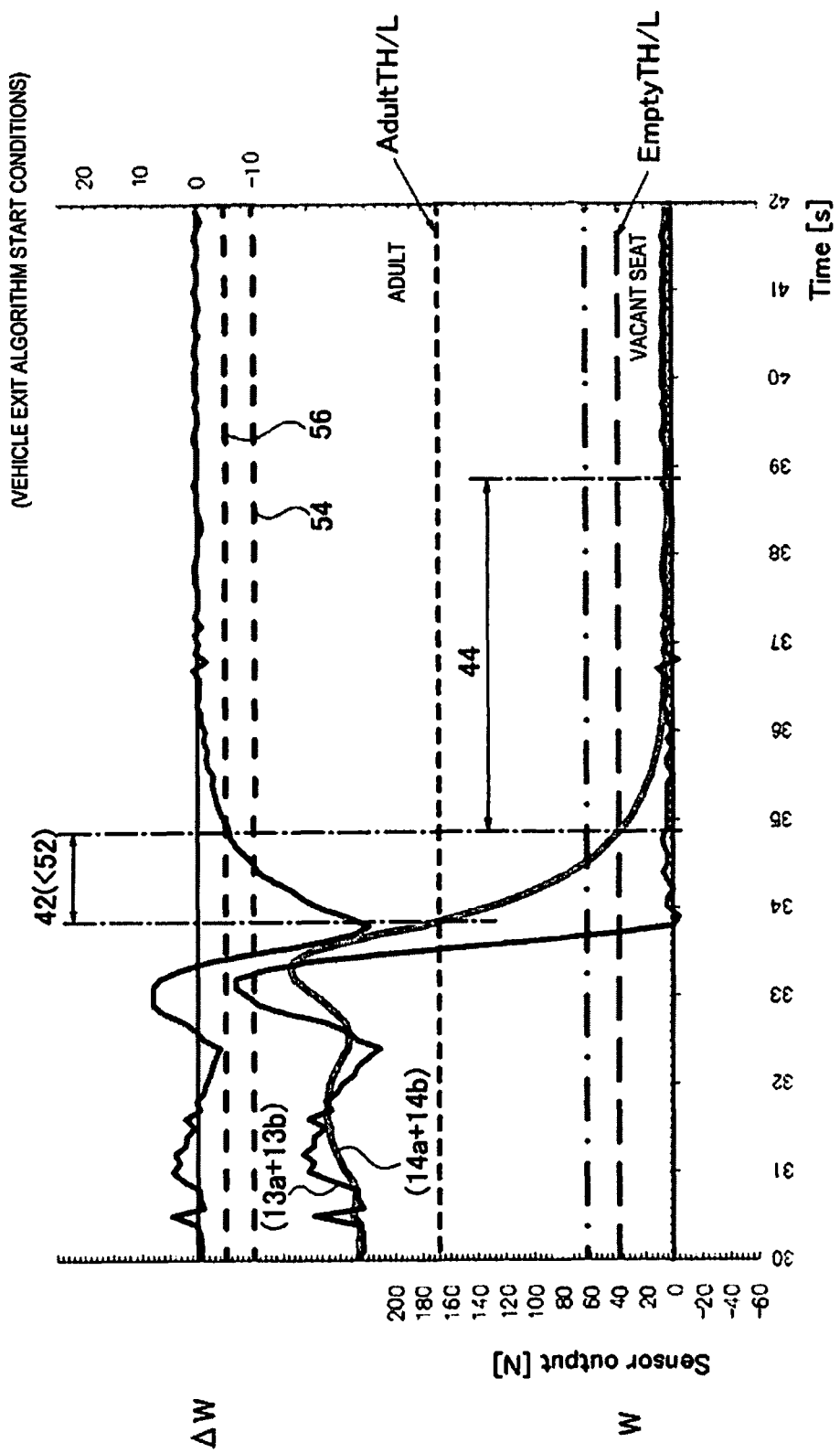
FIG. 7 is a graph showing a detected load and a load change amount for explaining the vehicle exit algorithm.

Also, the vehicle entry and exit determination section 23 performs the stability judgment process on before vehicle entry (segment 43) when there is vehicle entry (segment 41) from a vacant seat state such as shown in FIG. 6, or on after vehicle exit (segment 44) when there is a vacant seat state due to a vehicle exit (segment 42) such as shown in FIG. 7. The stability judgment process on before vehicle entry (segment 43) or after vehicle exit (segment 44) has a range set for the time needed to make a judgment of stable (approximately 4 seconds, for example), and is performed within that range.

Figure 8:
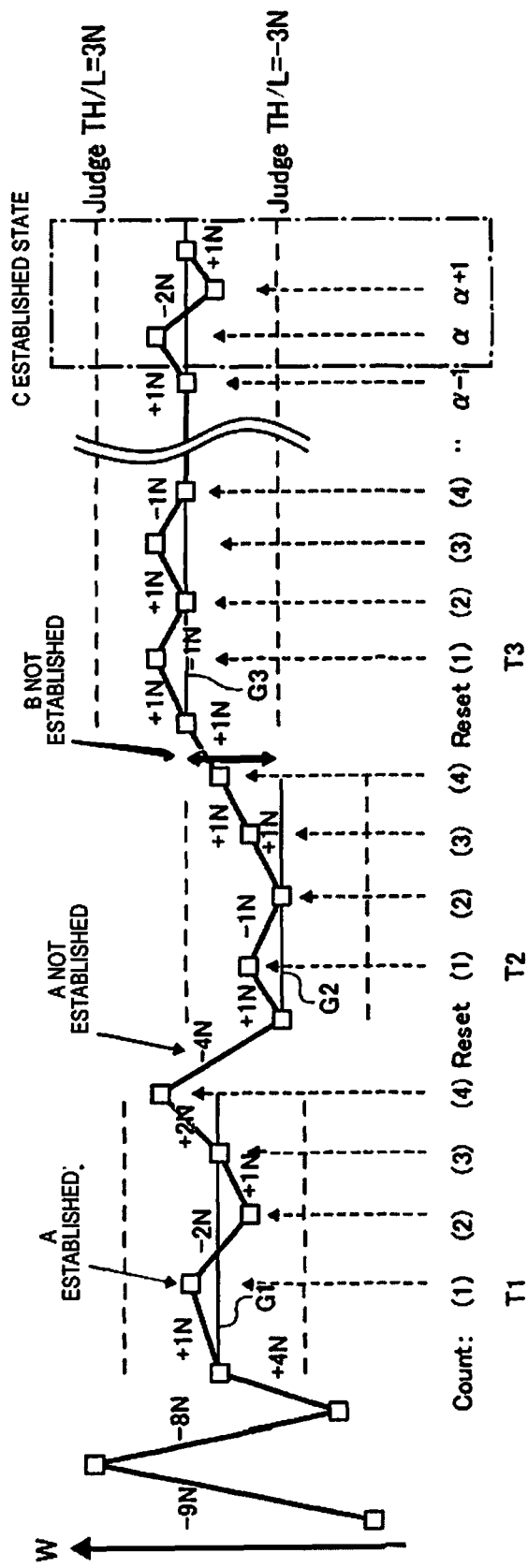
FIG. 8 is an explanatory drawing of the method of the stability judgment process.

FIG. 8 is a drawing showing the stability judgment process by the vehicle entry and exit determination section 23, and with this stability judgment process, first, using the absolute value of the difference between the current load (W(t)) and the previous load (W(t−1)) (|ΔW(t)| or abs (ΔW(t)): stability value), whether or not this absolute value is a prescribed judgment threshold value (JudgeTH/L) or less is found.

$|\Delta W(t)| < \text{Judge} TH/L$      Judgment A

However, ΔW(t)=Sen1(t)+Sen2(t)−(Sen1(t−1)+Sen2(t−1)). Also, for Sen1(t), Sen1(t−1), it is possible to use weight information such as vibration waveform removed signal 14a (LPF_Sen1(t), LPF_Sen1(t−1)), etc. which is a detection value with the vibration waveforms removed by the vibration waveform removing unit 14. Also, for Sen2(t), Sen2(t−1), it is possible to use weight information such as vibration waveform removed signal 14b (LPF_Sen2(t), LPF_Sen2(t−1)), etc. which is the detection value with the vibration waveforms removed by the vibration waveform removing unit 14. The judgment threshold value (JudgeTH/L) is a threshold value for identifying stable or unstable (first threshold value for stability judgment), and can be set to any size according to the status.

With the stability judgment process, second, when the aforementioned judgment A is established, with the initially established value as a reference (=Gn: variable reference value), whether or not the difference between the current load (W(t)) and the previous load (W(t−1)) is within a required range (Gn±judgment threshold value (second threshold value for stability judgment)) is found. For this judgment threshold value, it is possible to use the same value as the judgment threshold value used for judgment A, or possible to use a different value. With this example, the same value is used.

$$Gn{\sim}\text{Judge}TH/L < W(t)-W(t-1) < Gn=\text{Judge}TH/L \qquad \text{Judgment B}$$

With the stability judgment process, third, with the number of times that the aforementioned judgment A and judgment B are both established as the count (stability count), a judgment is made of whether the number of times (stability judgment times) or the time (stability judgment time, approximately 3 seconds, for example) have continued for this count (judgment C).

The specific method of judging using the aforementioned three judgments (judgment A to judgment C) is as noted hereafter. FIG. 8 shows specific examples of applying the aforementioned judgment A to judgment C on the detected load waveform with 3 [N] for both the judgment threshold value of judgment A (first threshold value for stability judgment) and the judgment threshold value for judgment B (second threshold value for stability judgment).

With this drawing, at point in time T1, judgment A is established when the absolute value of the difference with one prior detected load is 1 [N] (<3 [N]), so judgment B is performed from point in time T1 with the load value at the one prior point in time as the variable reference G1, and to what extent judgment A and judgment B continue is counted. As a result, both are established together up to count 4, but at the next point in time, the absolute value of the difference of the detected loads becomes 4 [N] (>3 [N]), and judgment A is not established, so the count is stopped and resetting is done. Then, when the count number is 4, it has not yet reached the stability judgment count, so stability judgment is not performed.

Next, at point in time T2, the absolute value of the difference with the one prior detected load becomes 1 [N] (<3 [N]) and judgment A is established again, so judgment B is performed from point in time T2 with the load value of the one prior point in time as the variable reference G2, and to what extent judgment A and judgment B continue is counted. As a result, both of these are established together up to count 4, but at the next point in time, the detected load becomes equal to the value of G2+3 [N] and judgment B is not established, so the count is stopped and resetting is done. Then, when the count number is 4, the stability judgment count has not been reached yet, so stability judgment is not performed.

After that, at point in time T3, the absolute value of the difference with the detected load at one prior point in time is again 1 [N] (<3 [N]) and judgment A is established, so the one prior load value is used as variable reference G3, and judgment B is performed from point in time T3, and to what extent judgment A and judgment B continue is counted. As a result, even when the count exceeds the set stability judgment count (or can also be a stability judgment time), both items continue to be established together, so at the point in time when the count number a reaches the stability judgment count, judgment C is established. As a result, judgment results of being stable can be obtained by calculation.

Figure 9:
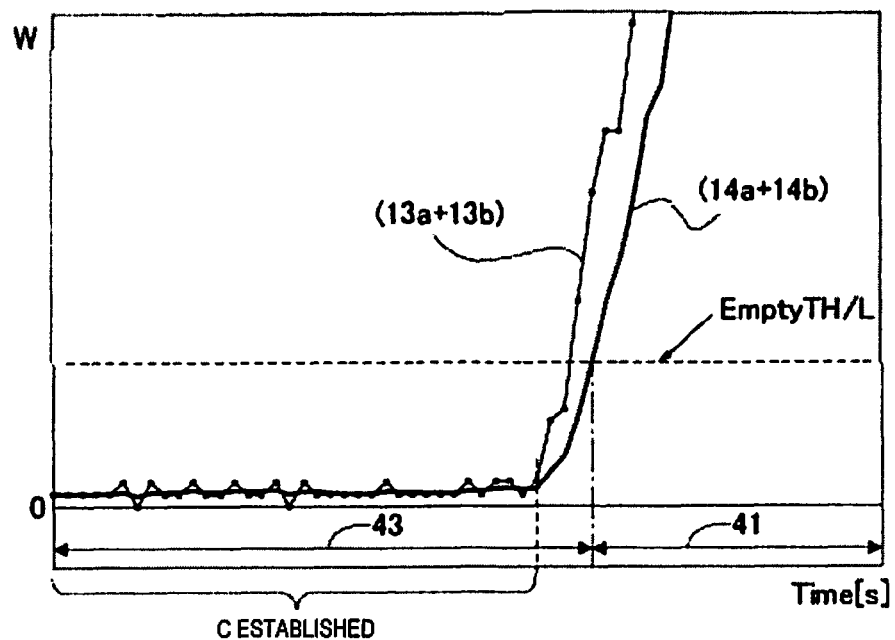
FIG. 9 is a graph showing the state when a passenger enters a vehicle while the vehicle is stopped.

Applying this to a specific case, in a case of vehicle entry when the vehicle is stopped such as in FIG. 9, with the vehicle entry and exit determination section 23, when it is detected that vehicle entry from a vacant seat state (segment 41) is applicable by the detected load W exceeding the third threshold value (EmptyTH/L) of the passenger judgment threshold values and then further exceeding the first threshold value (AdultTH/L, not illustrated), the aforementioned calculations (judgment A to judgment C) are performed going back to before vehicle entry (segment 43) (by reading data recorded in the memory 22, etc.), but the judgment C continues over a long enough time to exceed the stability judgment count or the stability judgment time, so judgment C is established, and a judgment of stable is possible.

Figure 10:
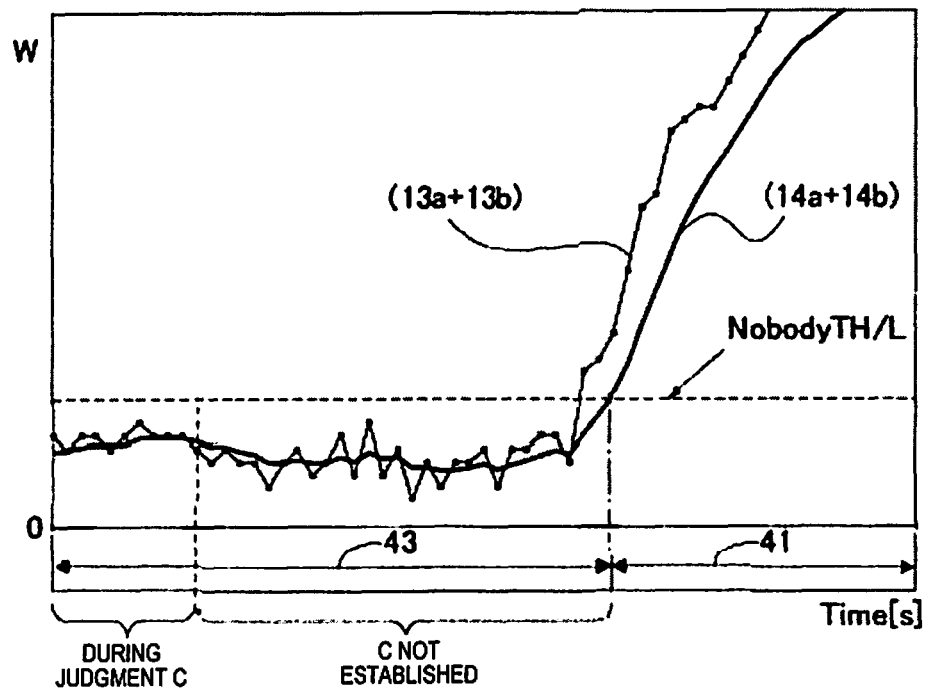
FIG. 10 is a graph showing the state while traveling on a curve.

In contrast to this, when traveling on a curve such as shown in FIG. 10, with the vehicle entry and exit determination section 23, when it is detected that vehicle entry from the vacant seat state (segment 41) is applicable by the detected load W exceeding the third threshold value (EmptyTH/L) of the passenger judgment threshold values and then further exceeding the first threshold value (AdultTH/L, not illustrated), the aforementioned calculations (judgment A to judgment C) are performed going back to before vehicle entry (segment 43) (by reading data recorded in the memory 22, etc.), but the judgment C count is short enough to not reach the stability judgment count or the stability judgment time, and after that, the judgment C non-establishment state continues, so a judgment of stable is not possible. In the case shown in FIG. 10, rather than using the third threshold value (EmptyTH/L), the example actually uses a threshold value (NobodyTH/L) that determines the presence or absence of luggage that is slightly heavier than the third threshold value (EmptyTH/L).

Figure 11:
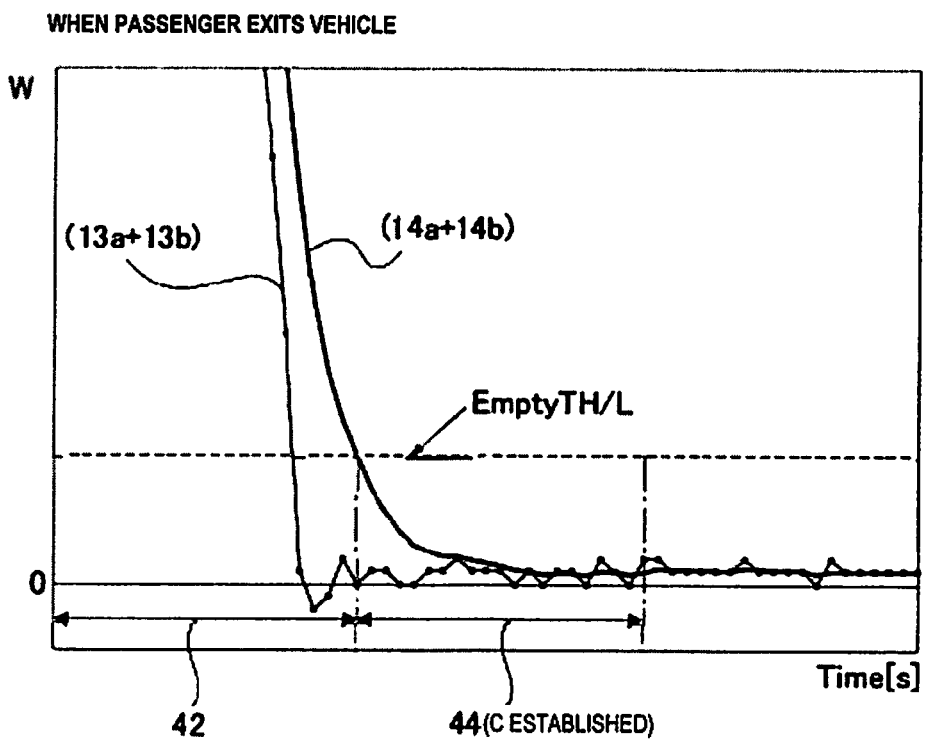
FIG. 11 is a graph showing the state when a passenger exits a vehicle while the vehicle is stopped.

Also, in the case of vehicle exit when the vehicle is stopped such as in FIG. 11, with the vehicle entry and exit determination section 23, when it is detected that the vacant seat state is applicable by vehicle exit (segment 42) by the detected load W going below the first threshold value (AdultTH/L, not illustrated) of the passenger judgment threshold values and then further going below the third threshold value (EmptyTH/L), the aforementioned calculations (judgment A to judgment C) are performed for after vehicle exit (segment 44 thereof), but judgment C continues over a long enough time to exceed the stability judgment count or the stability judgment time, so judgment C is established, and a judgment of stable is possible.

Figure 12:
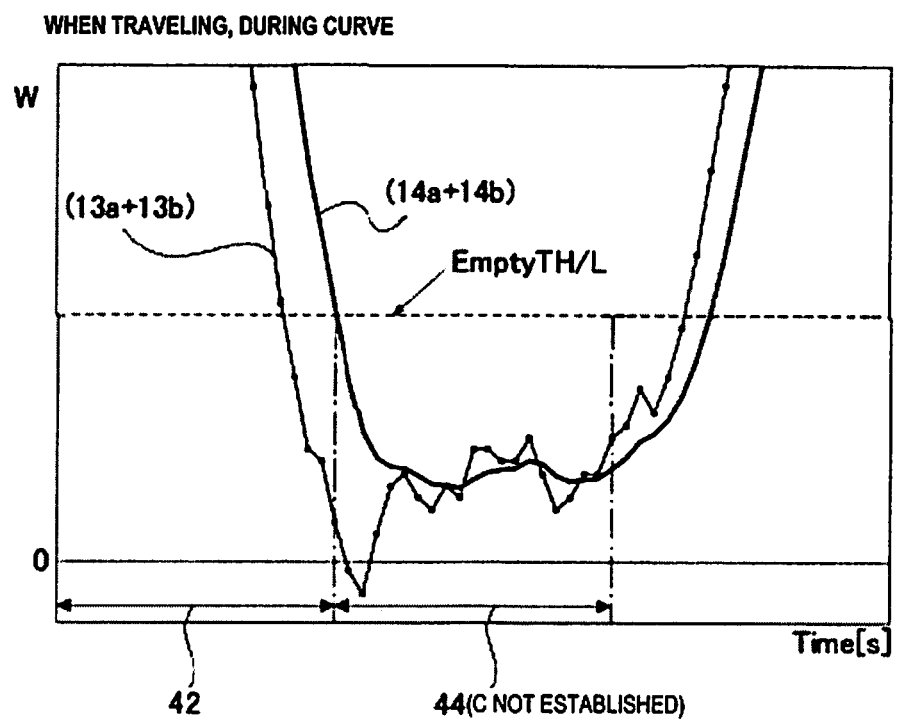
FIG. 12 is a graph showing the state while traveling on a curve.

In contrast to this, when traveling on a curve such as shown in FIG. 12, with the vehicle entry and exit determination section 23, when it is detected that the vacant seat state by vehicle exit (segment 42) is applicable by the detected load W going below the first threshold value (AdultTH/L, not illustrated) of the passenger judgment threshold values and then further going below the third threshold value (EmptyTH/L), the aforementioned calculations are performed for after vehicle exit (segment 44 thereof), but the judgment C is short enough (almost none) to not reach the stable judgment count or the stable judgment time, and the state of judgment C being not established continues, so a judgment of stable is not possible.

(2) Furthermore, as shown in FIG. 6 and FIG. 7, it is also possible to make it so that with the aforementioned vehicle entry and exit determination section 23, the abovementioned calculations (stability calculations of (1)) to find whether stable or not are performed only in cases when the load change time (length of segments 41, 42) of the detection values (detection values 13*a*, 13*b* or vibration waveform removed signals 14*a*, 14*b*) indicating a vacant seat state by vehicle entry (segment 41) from the vacant seat state or by vehicle exit (segment 42) satisfy a preset time-related condition for determining vehicle entry or vehicle exit.

Here, as shown in FIG. 6, for example, with the vehicle entry and exit determination section 23, it is possible to make it so that the time-related condition at the time of vehicle entry (when the detected load W increases) is within the time required for changing from the vacant seat state to the vehicle entry state (EmptyTH/L→AdultTH/L) (time required to enter vehicle 51, for example, the segment 41 elapse time is approximately 7 seconds or less).

Also, as shown in FIG. 7, with the vehicle entry and exit determination section 23, it is possible to make it so that the time-related condition during vehicle exit (when the detected load W decreases) is within the time required for changing from the vehicle exit state to the vacant seat state (AdultTH/L→EmptyTH/L) (time required to exit vehicle 52, for example, the segment 42 elapse time is approximately 4 seconds or less).

The aforementioned time-related conditions (time required to enter vehicle 51, time required to exit vehicle 52) can respectively be set as appropriate based on the average time required for an adult to enter the vehicle and exit the vehicle. However, the specific values of the aforementioned time-related conditions are not limited to the items noted above.

(3) Alternatively, with the aforementioned vehicle entry and exit determination section 23, it is also possible to have the aforementioned calculations to find whether stable or not (stability calculations of (1)) performed only when the load change mount ΔW of the detection values (detection values 13a, 13b or vibration waveform removed signals 14a, 14b) indicating vehicle entry from a vacant seat state (segment 41) or a vacant seat state due to vehicle exit (segment 42) have fulfilled a preset load condition for determining vehicle entry or vehicle exit.

Here, as shown in FIG. 6, for example, with the vehicle entry and exit determination section 23, it is also possible to have the load conditions during vehicle entry (when there is an increase in the load change) be such that one time or more, the load change amount ΔW during detection of vehicle entry is a prescribed value or greater (for example, vehicle entry stability value 53=+10 [N]) (load change amount ΔW≥10 [N]), etc.

Figure 13:
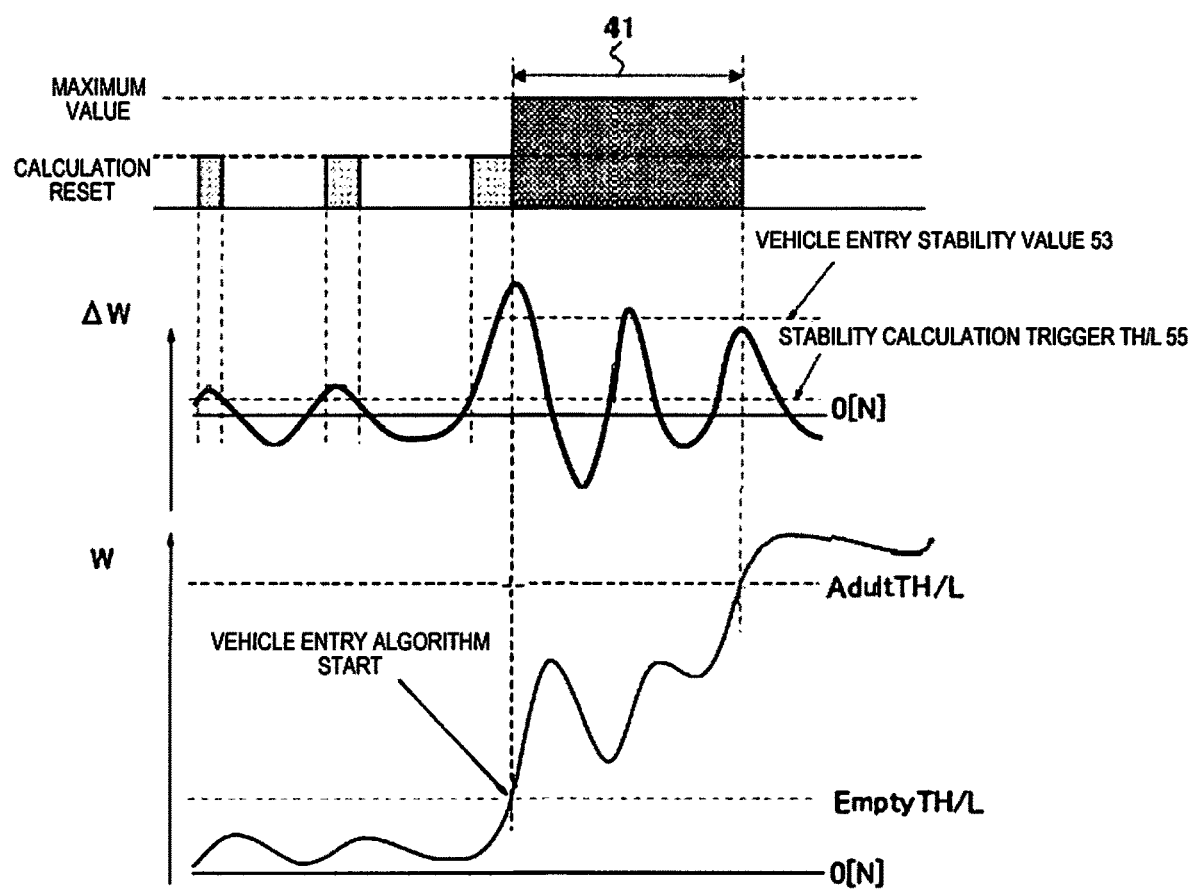
FIG. 13 is an explanatory drawing of the method of load change judging when the passenger enters into the vehicle.

In specific terms, during vehicle entry, as shown in FIG. 13, the vehicle entry and exit determination section 23 monitors whether a load change amount ΔW is seen that goes above a prescribed value (+10 [N]) during the vehicle entry judging period (EmptyTH/L→AdultTH/L, segment 41).

Figure 14:
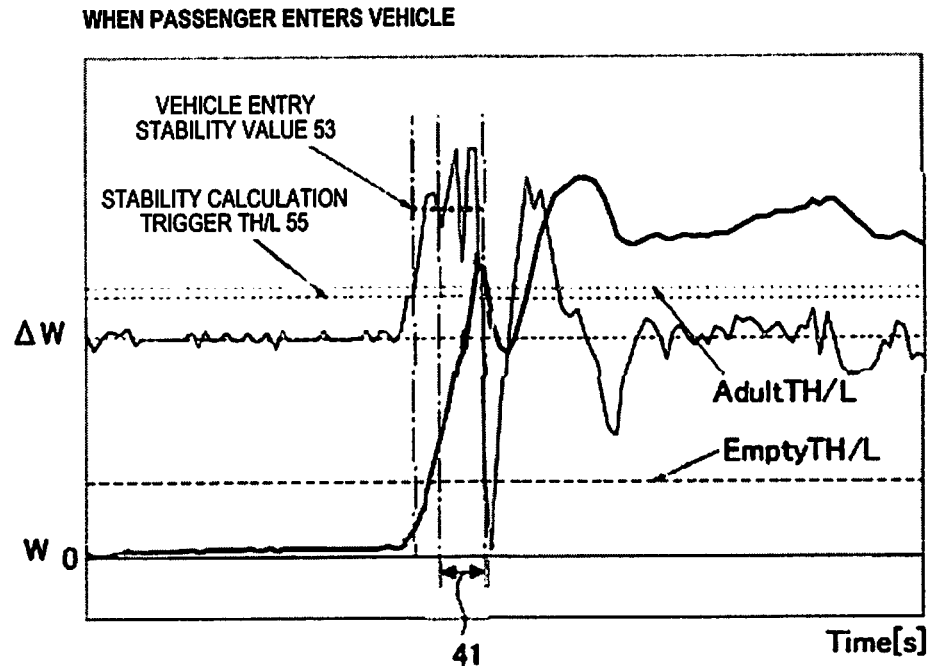
FIG. 14 is a graph showing the state when a passenger enters a vehicle while the vehicle is stopped.
Figure 15:
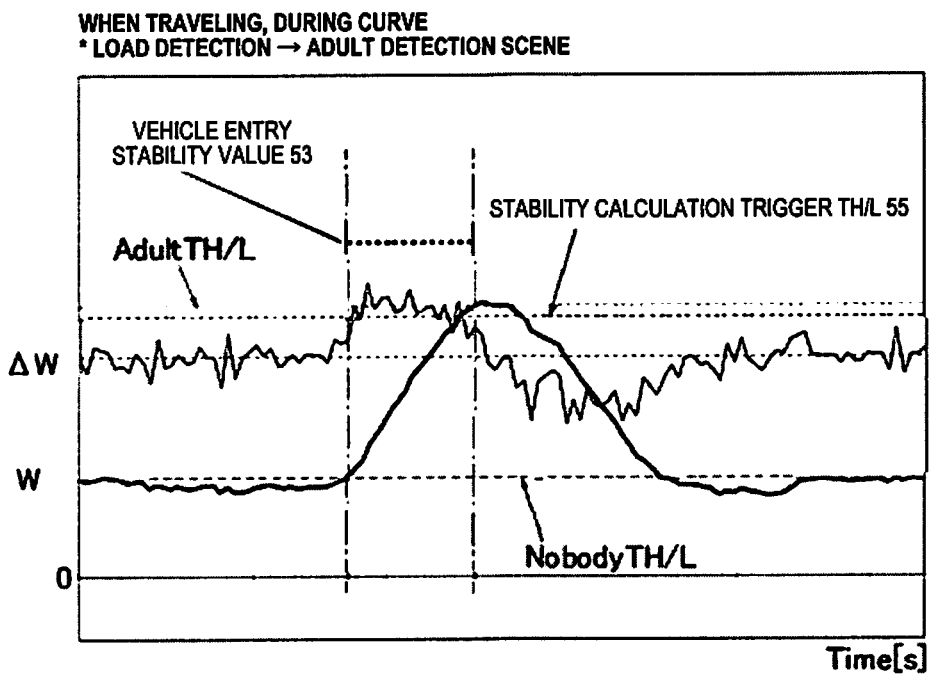
FIG. 15 is a graph showing the state while the vehicle travels on a curve.

This is done this way because during the vehicle entry judging period, in a case when the vehicle is stopped such as shown in FIG. 14, in accordance with the vehicle entry operation, in contrast to seeing many load changes that go above the prescribed value (+10 [N]), in the case of traveling on a curve such as shown in FIG. 15, almost no cases are seen of the load change going above the prescribe value (+10 [N]). Because of that, by monitoring the load changes that go above the prescribed value (+10 [N]), it is possible to obtain the start timing of the stability judgment process (stability calculation).

Similarly, as shown in FIG. 7, the vehicle entry and exit determination section 23 can also have the load condition during vehicle exit (when there is a decrease in the load change) be that one time or more, the load change amount ΔW during detection of vehicle exit is a prescribed value or less (for example, vehicle exit stability value 54=−10 [N]) (load change amount ΔW≤−10 [N]).

Figure 16:
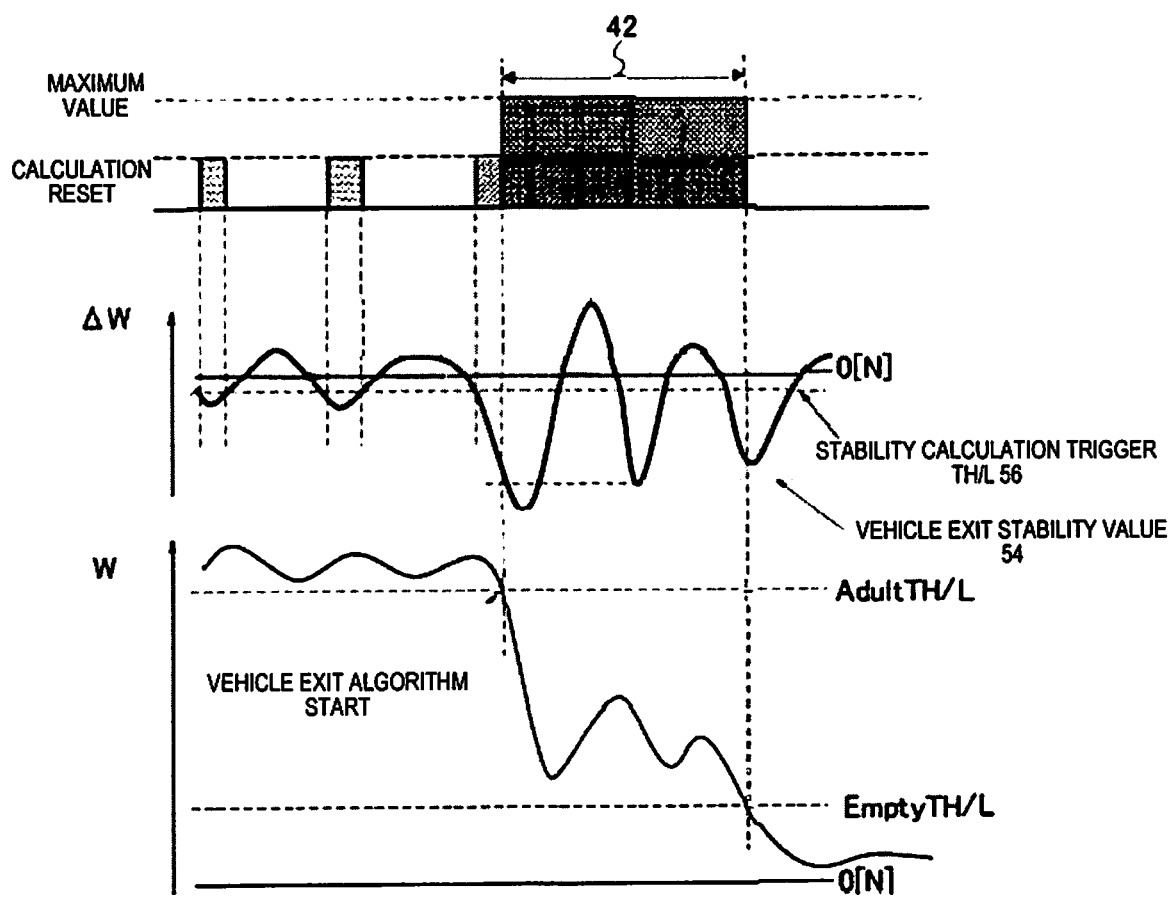
FIG. 16 is an explanatory drawing of the method of load change judging when the passenger exits the vehicle.

In specific terms, during vehicle exit, as shown in FIG. 16, the vehicle entry and exit determination section 23 monitors whether a load change amount ΔW is seen that goes below a prescribed value (stability calculation trigger threshold value during vehicle exit: −10 [N]) during the vehicle exit judging period (AdultTH/L→EmptyTH/L, segment 42).

Figure 17:
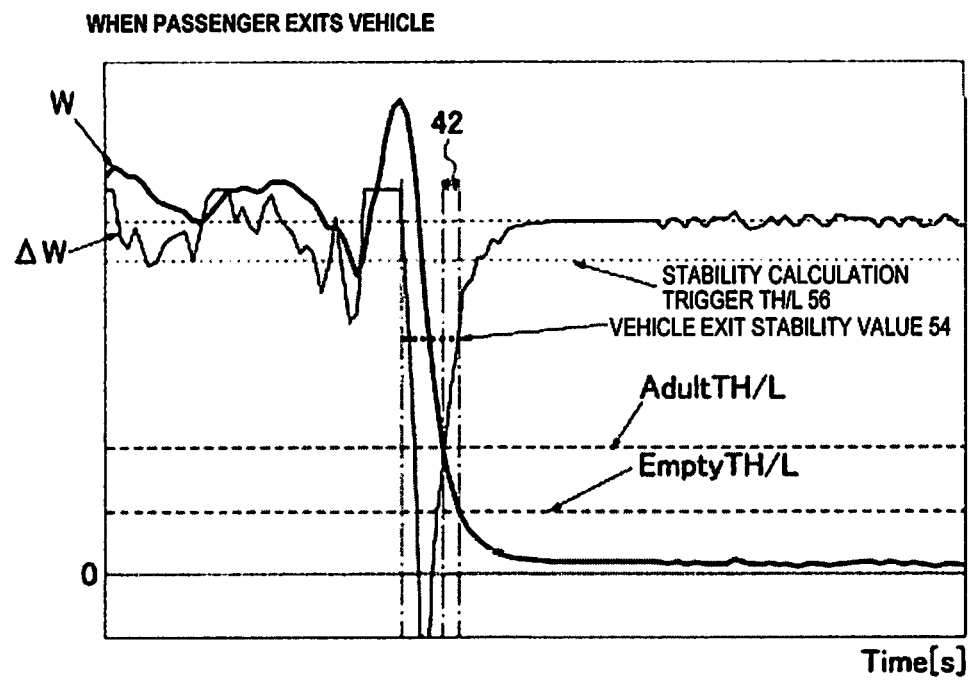
FIG. 17 is a graph showing the state when a passenger exits the vehicle while the vehicle is stopped.
Figure 18:
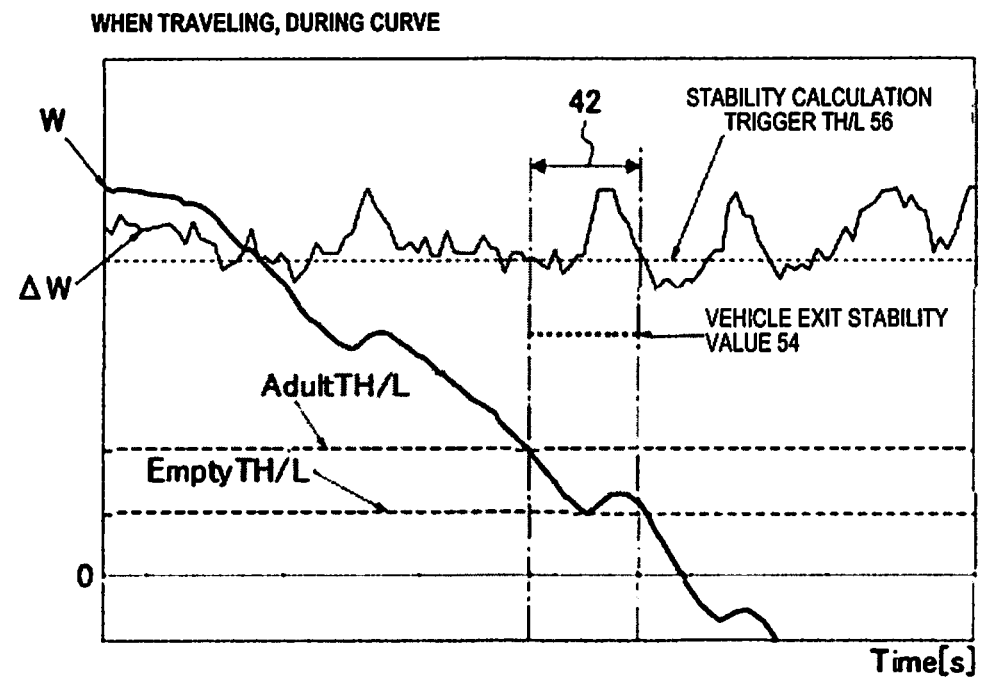
FIG. 18 is a graph showing the state while the vehicle travels on a curve.

This is done this way because during the vehicle exit judging period, in a case when the vehicle is stopped such as in FIG. 17, in accordance with the vehicle exit operation, in contrast to many cases of load changes going below a prescribed value (−10 [N]) being seen, when traveling on a curve such as in FIG. 18, almost no load changes that go below the prescribed value (−10 [N] are seen. Because of that, by monitoring load changes that go below the prescribed value (−10 [N]), it is possible to obtain the start timing of the stability judgment process (stability calculation).

The aforementioned load condition (stability calculation trigger threshold value) is set as a value of the size that can distinguish between when the vehicle is stopped and when traveling on a curve. However, the specific value of the aforementioned load condition is acceptable provided it can determine vehicle entry and vehicle exit, and when traveling (on a curve), and is not limited to the items noted above.

Furthermore, it is possible to have the vehicle entry and exit determination section 23 always operate, the same as with the other parts of the passenger determination unit 15 (passenger determination section 16, vibration change amount judging section 17, load change amount judging section 18, etc.), but it is also possible to have it operate only when necessary. Because of that, for example, it is also possible to set a stability operation trigger threshold value 55 for vehicle entry (5 [N], for example) that is smaller than the vehicle entry stability value 53, or a stability operation trigger threshold value 55 for vehicle exit (−5 [N], for example) that is smaller than the vehicle exit stability value 54, and to have the operation of the vehicle entry and exit determination section 23 prepared when the load change amount ΔW exceeds the stability operation trigger threshold value 55 for vehicle entry or the stability operation trigger threshold value 55 for vehicle exit.

It is possible to perform one or both of: the stability calculation start judgment according to the time-related conditions of (2) and the stability calculation start judgment according to the load conditions of (3).

Operational Effects

The operational effects of this embodiment are as follows.

(Operational Effect 1) For example, when there is vehicle entry or vehicle exit when the vehicle is stopped, when the body weight of the passenger is abruptly applied to the seat 2, or the body weight of the passenger is suddenly not applied to the seat 2, a drastic load fluctuation occurs, and vibration occurs along with this. When the vibration change amount judging section 17 mistakenly judges this load fluctuation or vibration to be vibration during traveling, etc., even if passenger determination is performed by the passenger determination section 16, the passenger judgement section 21 holds the previous passenger determination result 16a rather than executing updating of the passenger determination result 16a.

However, when the vehicle is stopped, while in a state for which updating of the passenger determination result 16a is not executed (hold state) due to the effect of vibration, etc., when there is vehicle entry or vehicle exit, it is possible for an unforeseen circumstance to occur such as the vehicle 1 starting to travel immediately after the occurrence of a sudden vehicle entry or vehicle exit. In a state when this kind of sudden advance, etc., has occurred, it is necessary to make it possible to update the passenger determination result 16a early.

In light of that, by providing the vehicle entry and exit determination section 23, and monitoring entry and exit of the vehicle, even in a state when a disturbance has occurred with vibration that occurs accompanying vehicle entry or vehicle exit when the vehicle is stopped, and updating of the passenger determination result 16a is not executed, it has been made possible to execute updating of the passenger determination result early.

Specifically, the vehicle entry and exit determination section 23 has been made to monitor the occurrence of vehicle entry from the vacant seat state, or the occurrence of the vacant seat state due to vehicle exit. Then, when vehicle entry from the vacant seat state or the vacant seat state due to vehicle exit is applicable, calculation is used to find whether stable before vehicle entry or stable after vehicle exit. By doing this, it is possible to accurately judge whether this is sudden vehicle entry or vehicle exit that actually occurred when the vehicle is stopped, and it is possible to eliminate similar cases (to vehicle entry and exit when the vehicle is stopped) such as when on a gentle curve while traveling. The gentle curve while traveling has low stability of the waveform correlating to before vehicle entry and after vehicle exit, so it is possible to distinguish these by performing judgment regarding stability.

Thus, even when the passenger judgement section 21 is in a state when a disturbance has occurred in relation to updating of the passenger determination result 16a due to receiving signals that there is vehicle vibration 17a from the vibration change amount judging section 17, it is possible to cancel the hold state temporarily (1 second, for example) and execute updating of the passenger determination result 16a with the passenger judgement section 21, and possible to quickly and accurately update the status of sudden vehicle entry or vehicle exit, etc. that occurred when a disturbance was occurring regarding updating of the passenger determination result 16a due to the effect of vehicle entry and exist when the vehicle is stopped, for example.

(Operational Effect 2) By checking whether or not the preset time-related condition for determine vehicle entry or vehicle exit is satisfied by the load change time of the detected load W according to the detection values (detection values 13a, 13b or vibration waveform removed signals 14a, 14b) indicating vehicle entry from the vacant seat state or the vacant seat state due to vehicle exit, it is possible to exclude most cases such as gentle curves when traveling, etc. with a wavelength similar to (sudden) vehicle entry and exit when the vehicle is stopped.

Thus, it is possible to make it so that there are not too many unnecessary (or excessive or frequent) calculations performed to check whether before vehicle entry is stable or after vehicle exit is stable. As a result, it is possible to have a low calculation process count and reduce the load as well as prevent erroneous judgment, and possible to further increase the precision of stability judgment.

When there is (sudden) vehicle entry and exit when the vehicle is stopped, the load change time of the detection value is a value in a range that is set to some degree, whereas when there is a gentle curve during traveling, each load change time of the detection value is different according to the state when traveling on the curve (for example weight on the seat 2 or speed or steering angle of the vehicle 1, etc.), so by narrowing by the load change time, it is possible to exclude most of the curve travel.

(Operational Effect 3) By checking whether the load change amount ΔW (vibration change amount Δv) of the detection values (detection values 13a, 13b or vibration waveform removed signals 14a, 14b) indicating vehicle entry from the vacant seat state or the vacant seat state due to vehicle exit satisfies the preset load condition for discriminating between vehicle entry or vehicle exit, it is possible to exclude most of the cases such as gentle curves while traveling, etc., with a waveform similar to (sudden) vehicle entry and exit when the vehicle is stopped.

Thus, it is possible to not have many unnecessary (or excessive or frequent) calculations performed for checking whether stable before vehicle entry or stable after vehicle exit. As a result, it is possible to have a low calculation process count and reduce the load as well as prevent erroneous judgments, and possible to further increase precision of stability judgment.

In the case of (sudden) vehicle entry and exit when the vehicle is stopped, compared to when there is included in the load change amount ΔW of the detection value a part with an unexpectedly large fluctuation due to the effect of exiting the vehicle (load fluctuation, vibration, etc.), when there is a gentle curve while traveling, parts with unexpectedly large fluctuation such as with vehicle entry and exit when the vehicle is stopped are almost never seen in the load change amount ΔW of the detection values 13a, 13b, so it is possible to exclude most of the curve travel by narrowing with the load change amount ΔW.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a vehicle.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle passenger detection apparatus comprising:
    a load sensor attached in the vicinity of a seat of a vehicle, and configured and arranged to detect a load acting on the seat; and
    a passenger detection unit configured and arranged to detect a passenger on the seat based on a detection value of the load sensor, the passenger detection unit including
        a passenger determination section configured to determine a sitting state of the passenger on the seat based on the detection value of the load sensor and a passenger judgment threshold value,
        a vibration change amount judgment section configured to determine presence or absence of vehicle vibration based on the detection value of the load sensor and a vibration threshold value, and
        a passenger judgment section configured to judge whether to update a passenger determination result from the passenger determination unit or to maintain a previous passenger determination result, based on a determination result from the vibration change amount judgment section, and
        a vehicle entry and exit determination section configured to monitor an occurrence of the passenger entering into the vehicle from a vacant seat state, and to determine by calculations whether the detection value of the load sensor is stable before the passenger entered the vehicle, when the occurrence of the passenger entering into the vehicle from the vacant seat state is determined, wherein
    the passenger judgment section is configured to execute updating of the passenger determination result even in a state in which the determination result from the vibration change amount judgment section indicates a disturbance has occurred, when the vehicle entry and exit determination section determines that the detection value of the load sensor is stable before the passenger entered the vehicle.

2. The vehicle passenger detection apparatus of claim 1, wherein
    the vehicle entry and exit determination section is configured to perform the calculations to determine whether the detection value of the load sensor is stable only in a case when a load change time of the detection value satisfies a preset time-related condition for determining the occurrence of the passenger entering into the vehicle from the vacant seat state.

3. The vehicle passenger detection apparatus of claim 1, wherein
    the vehicle entry and exit determination section is configured to perform the calculations to determine whether the detection value of the load sensor is stable only in a case when a load change amount of the detection value satisfies a preset load condition for determining the occurrence of the passenger entering into the vehicle from the vacant seat state.

4. The vehicle passenger detection apparatus of claim 2, wherein
    the vehicle entry and exit determination section is configured to perform the calculations to determine whether the detection value of the load sensor is stable only in a case when a load change amount of the detection value satisfies a preset load condition for determining the occurrence of the passenger entering into the vehicle from the vacant seat state.

* * * * *